(12) United States Patent
Schmitz

(10) Patent No.: US 11,691,694 B2
(45) Date of Patent: *Jul. 4, 2023

(54) CLUTCH ARRANGEMENT, AND GEAR MECHANISM UNIT FOR A VEHICLE WHICH CAN BE DRIVEN BY MUSCLE POWER

(71) Applicant: Pinion GmbH, Denkendorf (DE)

(72) Inventor: Michael Schmitz, Mossingen (DE)

(73) Assignee: PINION GMBH, Denkendorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,693

(22) Filed: Jun. 10, 2022

(65) Prior Publication Data
US 2022/0297796 A1     Sep. 22, 2022

Related U.S. Application Data

(63) Continuation of application No. 17/008,558, filed on Aug. 31, 2020, now Pat. No. 11,377,171, which is a
(Continued)

(30) Foreign Application Priority Data

Mar. 1, 2018   (DE) ..................... 10 2018 104 692.8

(51) Int. Cl.
*F16D 41/26*     (2006.01)
*B62M 11/04*     (2006.01)
(Continued)

(52) U.S. Cl.
CPC ............ *B62M 11/04* (2013.01); *F16D 41/26* (2013.01); *F16D 41/30* (2013.01); *F16H 3/0915* (2013.01); *F16H 2200/0078* (2013.01)

(58) Field of Classification Search
CPC .......... F16D 41/24; F16D 41/26; F16D 41/30; F16D 41/28; F16D 41/06; F16D 41/069;
(Continued)

(56) References Cited

U.S. PATENT DOCUMENTS

| 4,732,347 A | 3/1988 | Stamboulian et al. |
| 5,078,664 A | 1/1992 | Nagano |

(Continued)

FOREIGN PATENT DOCUMENTS

| AT | 306536 B | 4/1973 |
| CN | 2573768 Y | 9/2003 |

(Continued)

OTHER PUBLICATIONS

DE117467C translation (Year: 2000).*
(Continued)

*Primary Examiner* — Timothy Hannon
(74) *Attorney, Agent, or Firm* — Reising Ethington P.C.

(57) ABSTRACT

A coupling arrangement for coupling members as a gear change coupling in a gear mechanism unit includes a first member and a second member. The first member has a coupling toothing system. At least one locking body arrangement is mounted pivotably on the second member. The locking body arrangement can be pivoted into a coupling position, in the case of which a driving section on the locking body arrangement engages into the coupling toothing system. The locking body arrangement can be pivoted into a release position, in the case of which the driving section of the locking body arrangement does not engage into the coupling toothing system. The locking body arrangement has a locking body carrier which is mounted pivotably on the second member, and has a locking body member which is mounted pivotably on the locking body carrier and on which the driving section is configured.

16 Claims, 10 Drawing Sheets

Related U.S. Application Data continuation of application No. PCT/EP2019/055011, filed on Feb. 28, 2019.

(51) Int. Cl.
   *F16D 41/30* (2006.01)
   *F16H 3/091* (2006.01)

(58) Field of Classification Search
   CPC ...... F16D 41/073; F16D 41/08; F16D 41/084; F16D 41/12; F16D 41/10; F16D 2041/0603; B62M 11/04; B62M 11/06
   See application file for complete search history.

(56) References Cited

U.S. PATENT DOCUMENTS

| | | | |
|---|---|---|---|
| 5,924,950 | A | 7/1999 | Pusic |
| 11,377,171 | B2* | 7/2022 | Schmitz ................ B62M 11/04 |
| 2008/0251342 | A1 | 10/2008 | Jones et al. |
| 2011/0251008 | A1 | 10/2011 | Schmitz et al. |
| 2013/0150200 | A1 | 6/2013 | Schmitz et al. |
| 2013/0279970 | A1 | 10/2013 | Hesl |
| 2014/0224049 | A1 | 8/2014 | Schmitz et al. |
| 2016/0186821 | A1 | 6/2016 | Alley |
| 2016/0195184 | A1 | 7/2016 | Lermen et al. |
| 2016/0265625 | A1 | 9/2016 | Schmitz |
| 2017/0029067 | A1 | 2/2017 | Schmitz |

FOREIGN PATENT DOCUMENTS

| | | |
|---|---|---|
| CN | 101657869 A | 2/2010 |
| CN | 102770338 A | 11/2012 |
| CN | 103373676 A | 10/2013 |
| DE | 19720794 A1 | 11/1998 |
| DE | 117467 C | 3/2000 |
| EP | 0383350 A2 | 8/1990 |
| EP | 1445088 A2 | 8/2004 |
| EP | 2512909 B1 | 1/2014 |
| EP | 2379402 B2 | 8/2017 |
| GB | 382750 A | 11/1932 |
| JP | 20160050607 A | 4/2016 |
| WO | WO2008089932 A1 | 7/2008 |
| WO | WO2015074885 A1 | 5/2015 |
| WO | WO2019166563 A1 | 9/2019 |

OTHER PUBLICATIONS

International Search Report corresponding to International Application No. PCT/EP2019/055011, dated Jul. 8, 2019, 5 pages.
Written Opinion corresponding to International Application No. PCT/EP2019/055011, dated Jul. 8, 2019, 5 pages.
International Preliminary Report on Patentability for PCT/EP2019/055011, The International Bureau of WIPO, dated Sep. 1, 2020, 5 pages.
Chinese Office Action with English translation corresponding to Chinese Application No. 201980016335.3, dated Dec. 16, 2021, 16 pages.
Japanese Office Action corresponding to Japanese Application No. 2020-544619, with English language summary, dated Jan. 12, 2023, 18 pages.

* cited by examiner

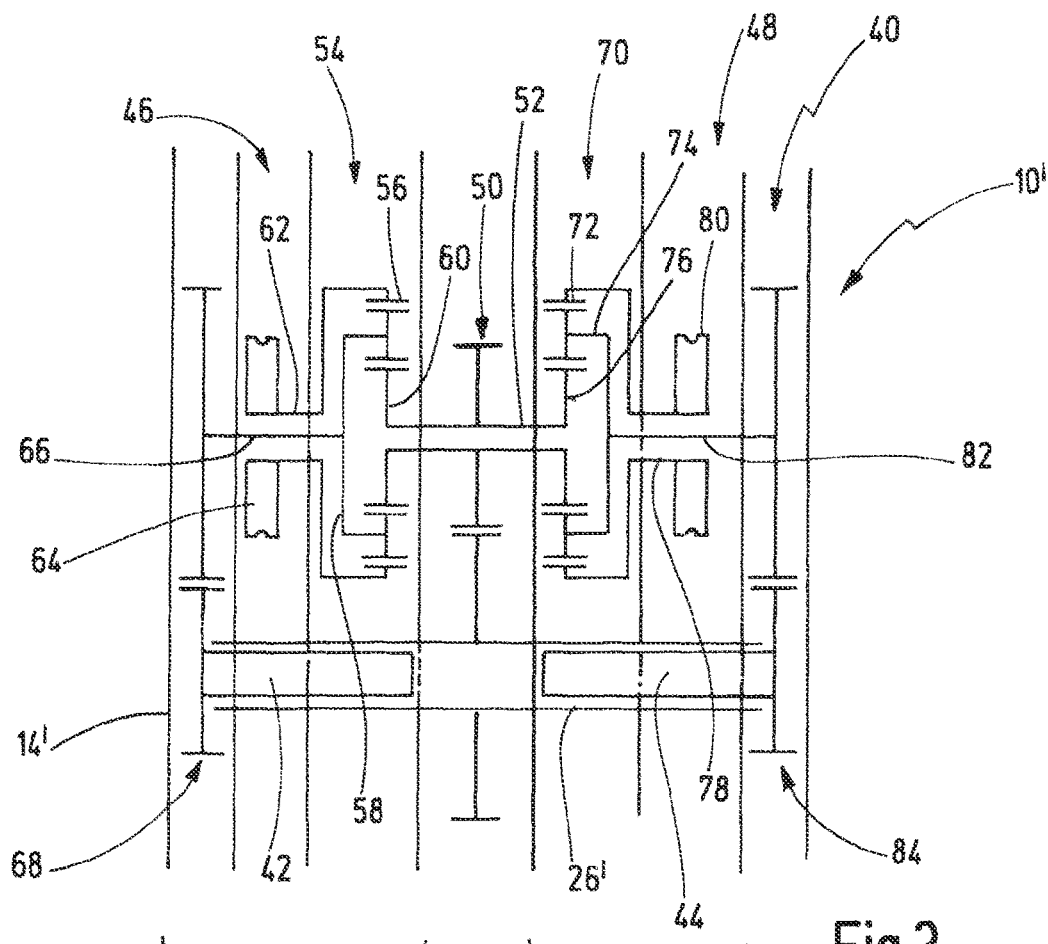
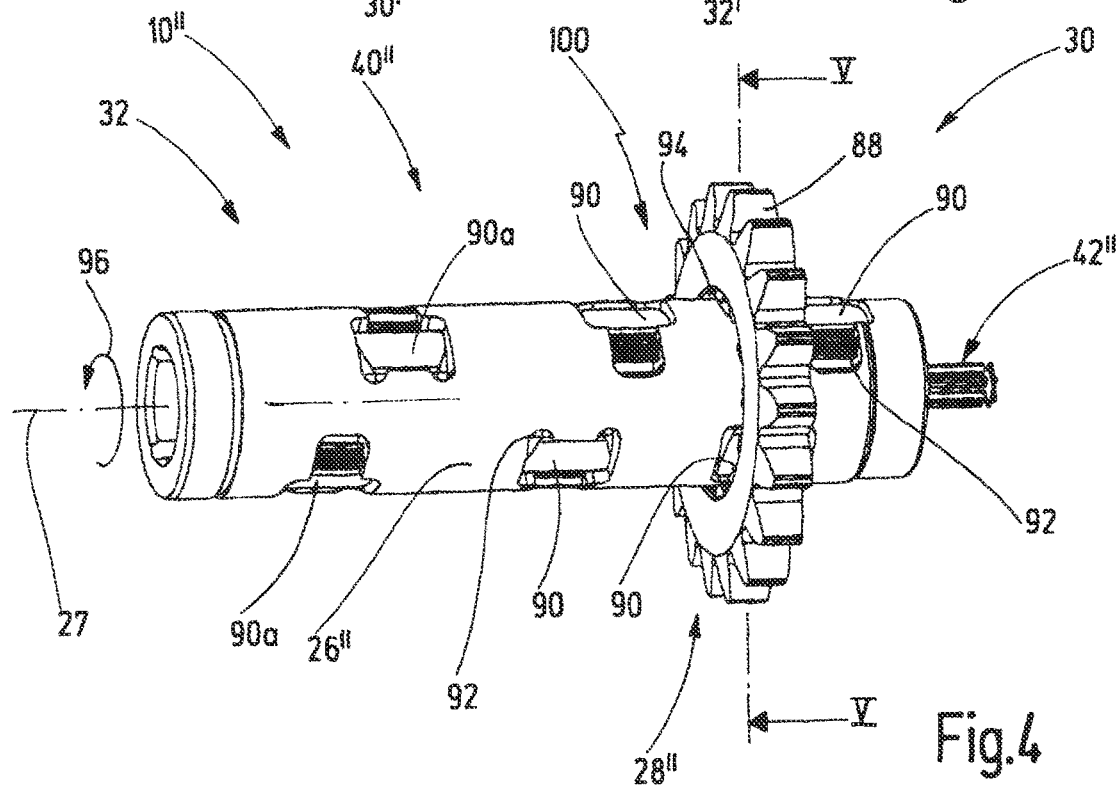

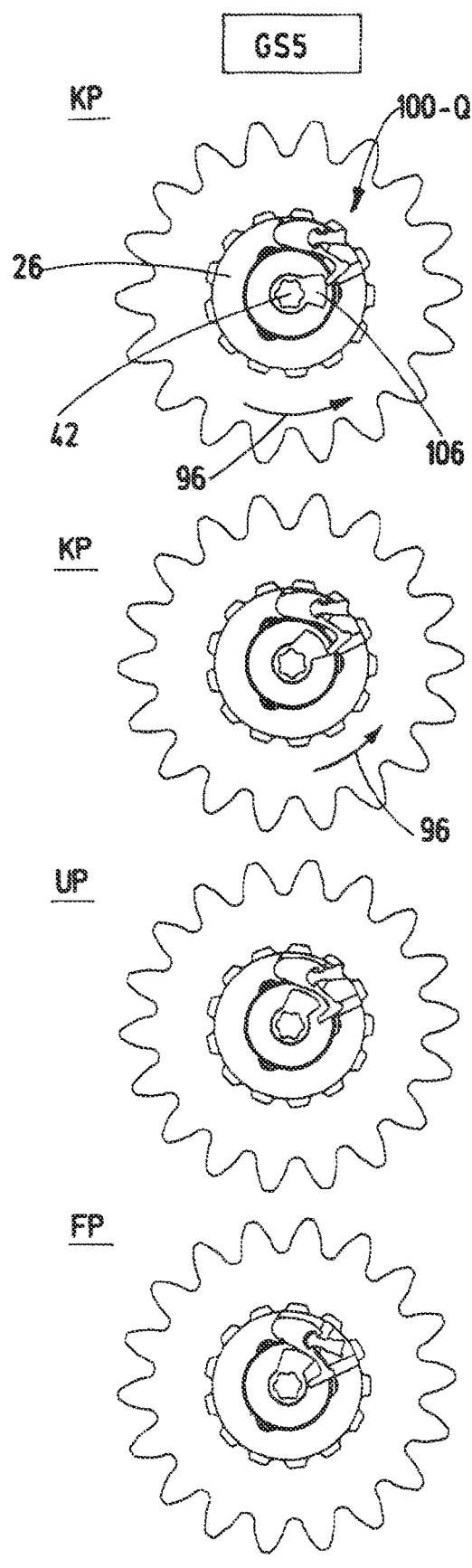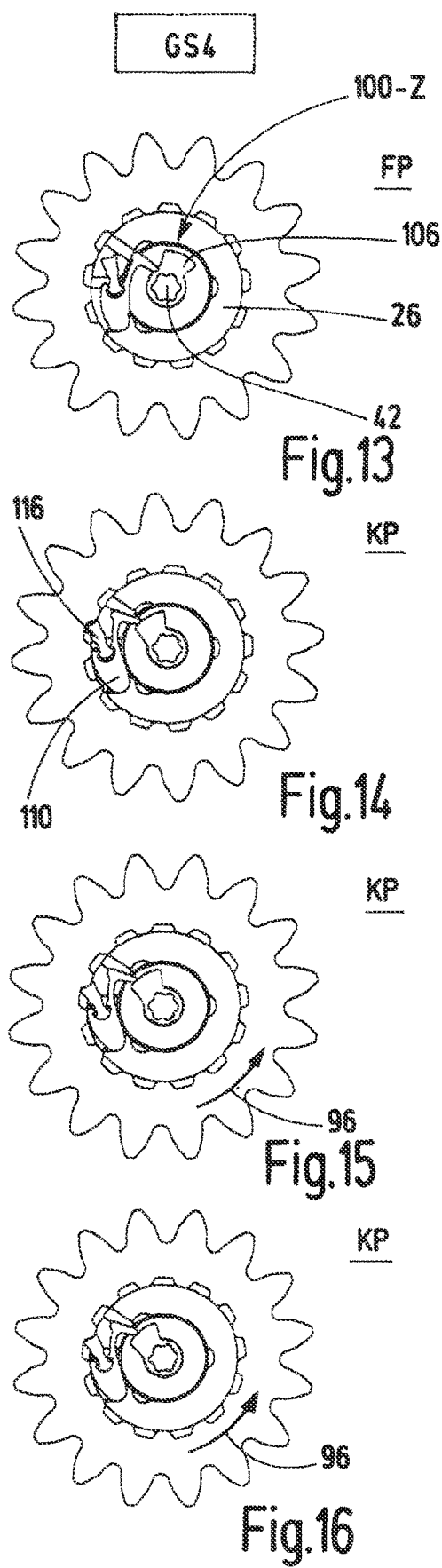

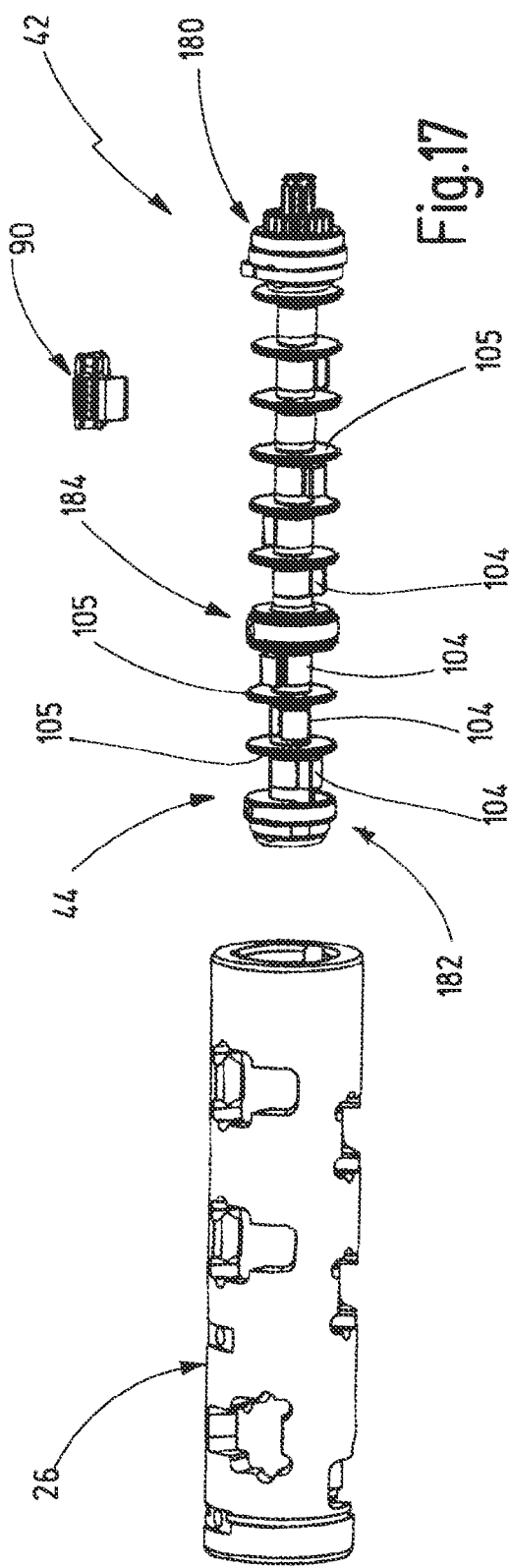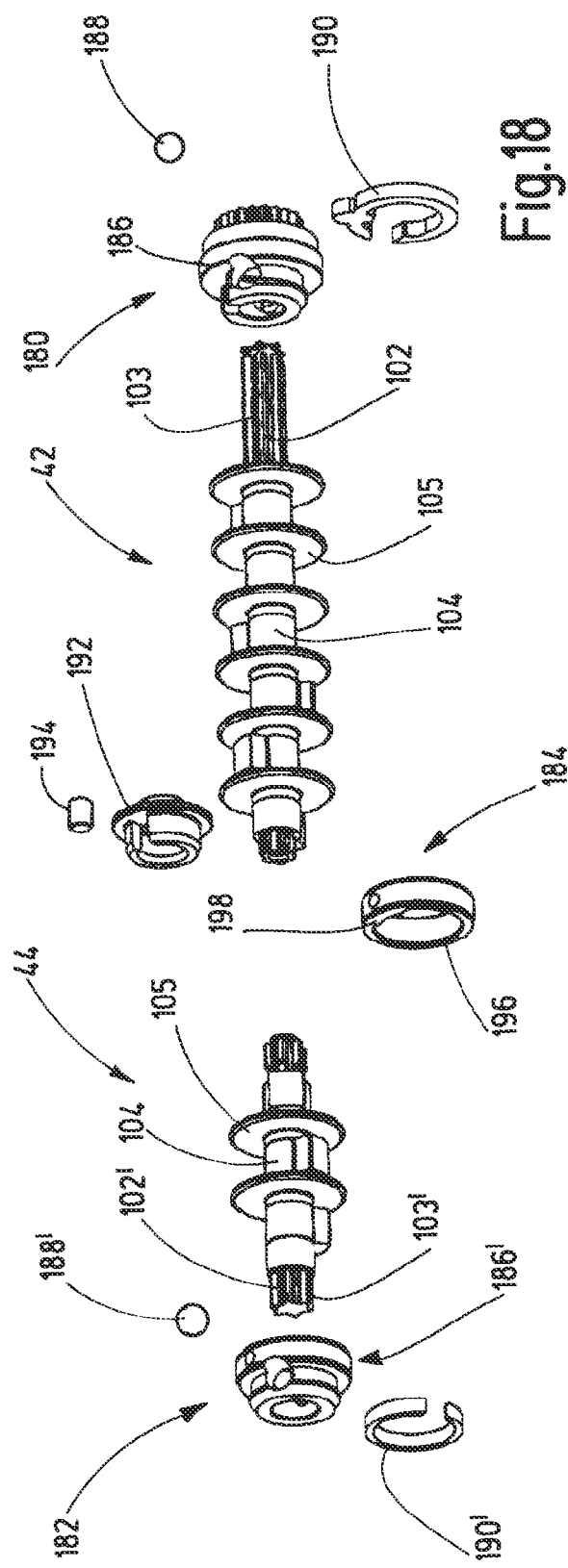

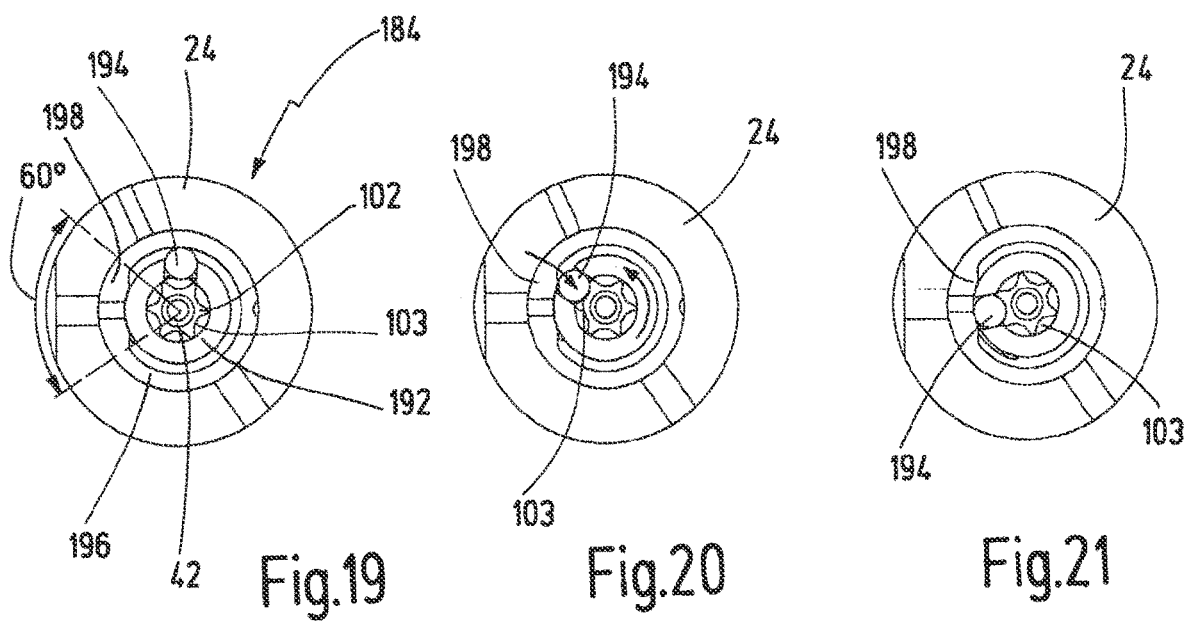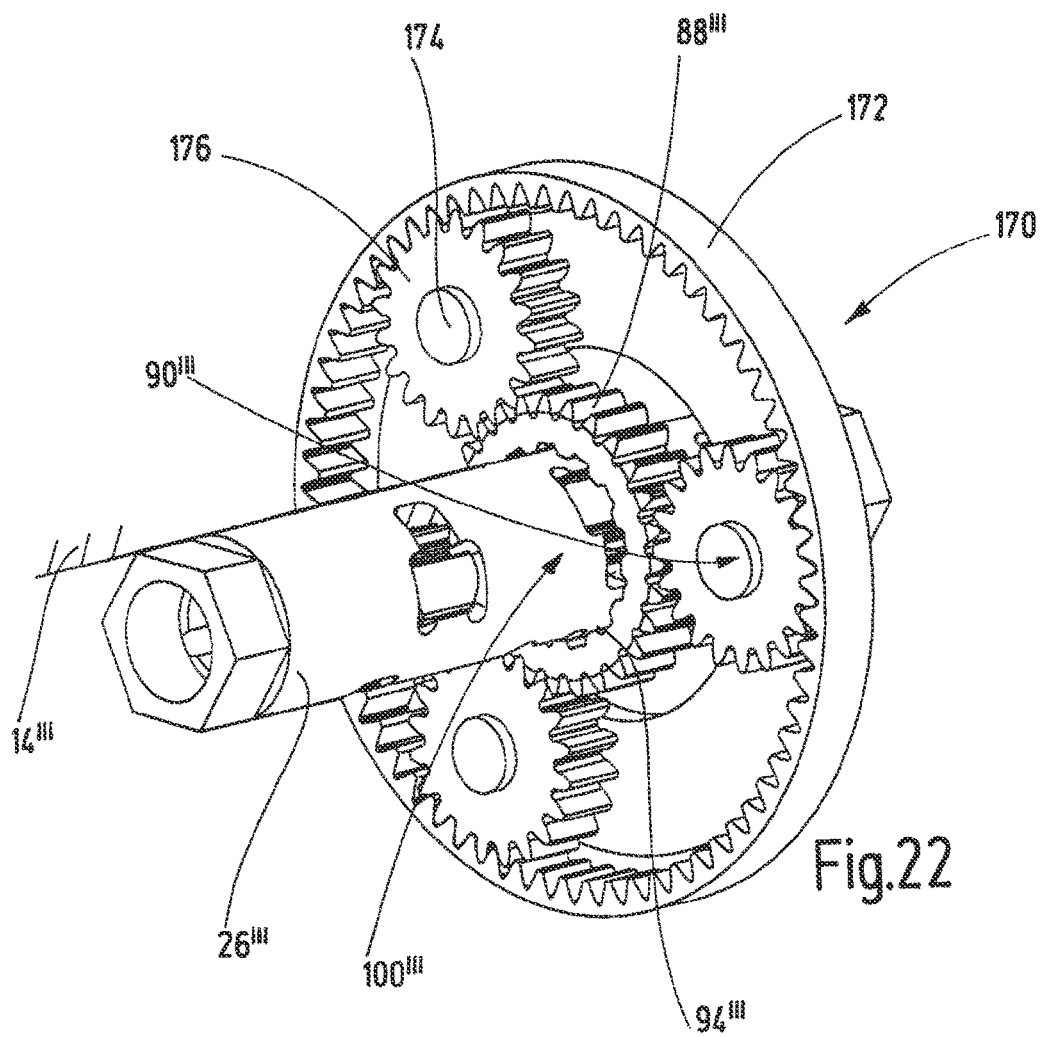

CLUTCH ARRANGEMENT, AND GEAR MECHANISM UNIT FOR A VEHICLE WHICH CAN BE DRIVEN BY MUSCLE POWER

CROSS-REFERENCE TO RELATED APPLICATIONS

This application is a continuation of U.S. application Ser. No. 17/008,558, filed Aug. 31, 2020, which is a continuation of International patent application PCT/EP2019/055011, filed Feb. 28, 2019 which claims the priority of German patent application DE 10 2018 104 692.8, filed Mar. 1, 2018, the entire content of these earlier applications being incorporated herein by reference.

BACKGROUND

The present invention relates to a coupling arrangement for coupling members, in particular as a gear change coupling in a gear mechanism unit, with a first member, which has a coupling toothing (also referred to as coupling toothing system) and with a second member, on which at least one locking body arrangement is mounted pivotably, it being possible for the locking body arrangement to be pivoted into a coupling position, in the case of which a driving section of the locking body arrangement engages into the coupling toothing system, in order to couple the first member to the second member in a positively locking manner with respect to a relative movement in a first direction, and it being possible for the locking body arrangement to be pivoted into a release position, in the case of which the driving section of the locking body arrangement does not engage into the coupling toothing system.

Furthermore, the present invention relates to a gear mechanism unit, in particular for a vehicle which can be driven by muscle power, with a gearwheel which forms a first rotary member and which is mounted rotatably on a gear mechanism shaft which forms a second rotary member, it being possible for the gearwheel to be connected to the gear mechanism shaft in a drive rotational direction by means of a coupling arrangement.

A coupling arrangement of the above-described type and a gear mechanism unit of the above-described type are known from document EP 2 379 402 B2.

Gear mechanism units of the above-described type serve to step up and/or step down muscle power and, as a result, to facilitate the driving of the vehicle. The vehicle is a bicycle in many cases, but can also be a tricycle, a vehicle with four wheels which is driven by way of muscle power, etc.

In principle, three types of gear change systems exist for vehicles which are driven by way of muscle power, to be precise derailleur systems, hub gear systems and vehicle central gear mechanisms.

Derailleur systems have remained substantially unchanged in the last decades. A chain transmits the drive power from a pedal crank to a rear axle of the vehicle, wherein a pinion pack is mounted on the rear axle and has up to twelve pinions, between which pinions a chain to be guided can be shifted to and fro by means of a rear derailleur which is fastened to the frame. Furthermore, most bicycles are additionally equipped with a gear change system on the chain ring of the pedal crank. Here, up to three chain rings are attached to the pedal crank, between which chain rings shifting can be carried out to and fro by means of a front derailleur which is fastened to the frame. Derailleur systems of this type provide up to 30 gears, many gears being systemically redundant. Some gears cannot be used or can be used merely in a restricted manner as a result of high friction losses, due to a diagonal chain course.

It is disadvantageous in the case of the principle of the derailleur system, in addition to the multiplicity of redundant gears and the friction losses, that the components lie exposed and are therefore subjected directly to environmental influences such as water and dirt. Furthermore, the derailleur system can be damaged and/or misaligned easily as a result of impacts.

The second type of commercially available bicycle gear change systems is the hub gear system. In contrast to the derailleur system, this is understood to mean a gear mechanism which is installed in the hub housing of the rear axle. Hub gear systems usually do not have any gear system components which lie on the outside and are therefore resistant to impacts and subjected to environmental influences to a lesser extent than the derailleur system. A hub gear system, as known, for example, from DE 197 20 794 A1, can currently realize up to 14 gears. An increase in the weight of the rotating masses is disadvantageous. The centroid of the bicycle moves toward the rear axle, which has an unfavorable effect on the driving properties, in particular in the case of mountain bikes with rear wheel suspension.

A further hub gear system is known from document EP 0 383 350 B1, in the case of which two planetary gear mechanisms are arranged coaxially with respect to a hub which is fixed on the housing. The input shaft can be connected to planetary carriers. The sun gears of the planetary gear mechanisms can be connected fixedly to the hub which is fixed on the housing so as to rotate with it via a rotatable gear change apparatus, in order to set up different transmission ratios. It is disadvantageous that the overall gear mechanism is complicated, is comparatively expensive in relation to the number of gears which can be realized, and results in a high weight.

The third variant of bicycle gear change systems is represented by the bicycle central gear mechanisms or bottom bracket gear mechanisms which are mounted in the region of the pedal crank. This type of bicycle gear change system is widespread nowadays in the case of commercially available bicycles. Bicycle gear mechanisms of this type have the advantage over conventional derailleur systems or hub gear systems that they do not have any components which lie exposed and are accordingly protected against impacts and environmental influences. The centroid of the bicycle moves into the center, the sum of the unsprung mass being reduced at the same time.

Document U.S. Pat. No. 5,924,950 A has disclosed a bicycle gear mechanism, with an input shaft, on which a plurality of drive gears are mounted, and a countershaft, on which a corresponding number of driven gears which can be selected are mounted. The gears which can be selected are selected by means of a plurality of free wheels and shifting pins which are arranged in the countershaft and can be displaced axially. The countershaft is connected via a planetary gear mechanism to a pinion as output member of the bicycle gear mechanism. The pinion is connected via a coupling to a sun gear of the planetary gear mechanism, and the internal gear of the planetary gear mechanism can be braked by means of a Bowden cable. Fourteen gears can be realized by way of said bicycle gear mechanism. The relatively large axial design and the relatively low number of gear stages which can be realized are disadvantageous.

Document WO 2008/089932 A1 has disclosed a bicycle gear mechanism which has two gear mechanism groups which are connected behind one another, with the result that the number of gear stages which can be realized results from a multiplication of the individual gears of the two component gear mechanisms. Furthermore, a compact design can be realized. In order to select idler gears, a camshaft is displaced axially. The gear mechanism has a comparatively high space requirement in the axial direction.

Document EP 1 445 088 has disclosed a gear change apparatus for a bicycle gear mechanism.

Document EP 2 379 402 B2 which was mentioned at the outset discloses a gear change apparatus for an encapsulated bicycle gear mechanism, in the case of which gear change apparatus a plurality of idler gears are mounted on a shaft, a shifting rod (also referred to as shifting pin) being arranged within the shaft, which shifting pin corotates with the shaft on account of a rotational speed superimposition gear mechanism. By way of actuation of the superimposition gear mechanism, a relative rotation can be realized between the shaft and the shifting pin. The rotational speed superimposition gear mechanism is configured as a planetary gear mechanism. Gear change means in the form of freewheels which can be selected or pivotable locking body arrangements are mounted on the shaft and can be actuated by way of actuating sections on the shifting pin. The locking bodies are configured as double-sided levers. The actuating sections are configured by way of radial recesses on the shifting pin.

One problem which is yet to be solved in the case of gear mechanism units for vehicles which are operated by way of muscle power is to carry out a change of gear stages under load. In the case of motor vehicle transmissions, this is generally possible by way of brakes or couplings of planetary gear sets, as are realized in converter automatic transmissions. Another concept is double clutch transmissions, in the case of which gear changes are carried out by way of overlapping actuation of friction couplings. All of said systems are too complicated, however, for vehicles which are operated by way of muscle power.

A gear change under load would be advantageous, however, precisely in the case of vehicles which are operated by way of muscle power, since a drop in tractive power can be avoided, for example, in the case of a gear change operation on an uphill slope.

SUMMARY

Against said background, it is an object of the invention to specify a coupling arrangement which can be switched under load, and a gear mechanism unit which is equipped with said coupling arrangement and is suitable, in particular, for a vehicle which is driven by way of muscle power.

In the case of the coupling arrangement mentioned at the outset, the above object is achieved by virtue of the fact that the locking body arrangement has a locking body carrier which is mounted pivotably on the second member, and has a locking body member which is mounted pivotably on the locking body carrier and on which the driving section is configured.

In the case of known gear change apparatuses of the above-described type, the fundamental problem for a gear change under load is to be seen in the fact that the source gear stage, that is to say the gear stage to be disengaged, cannot be disengaged reliably. Since a gear change under load means that a drive force is still being transmitted to a gear mechanism input shaft, high friction forces are produced in the region of a driving section on account of high torques, which high friction forces can make it impossible to disengage a gear stage. Even positively guided mechanisms frequently cannot then bring about a positive disengagement movement of a locking body arrangement into a release position.

Said fundamental problem can be solved by way of forming the locking body arrangement by way of two members which, as it were, are connected to one another "in series". This is because it is generally possible as a result of the two-member nature firstly to transmit a force from the second member to the locking body carrier and from the latter to the locking body member which then engages in turn with its driving section into the coupling toothing system, in order to realize a coupling position in the drive direction in this way. Secondly, it is possible as a result of the two-member nature to cancel said coupling position again in a comparatively simple manner.

Therefore, the configuration of the locking body arrangement by way of a locking body carrier and a locking body member can be configured or comprehended in the manner of a "toggle lever". In the case of said embodiment, the change body carrier is a one-sided lever, on which a further (preferably one-sided) lever can be pivoted in the form of the locking body member.

The pivotability of the locking body carrier and the locking body member preferably takes place by way of rotational axes which are not fixed, but rather can change in a manner which is dependent on the relative angular position, in the manner of a curved joint, in the case of which elements the members which are coupled via the joint make contact in a substantially linear manner.

A source gear stage can be disengaged in a simple way in a gear mechanism unit by means of a coupling arrangement even if high forces are transmitted in a drive direction via the locking body arrangement and, as a consequence, there are high friction forces between the driving section and the coupling toothing system. Here, the pivoting of the locking body arrangement into the release position is preferably made possible by virtue of the fact that the locking body member and the locking body carrier are pivoted against one another.

The coupling arrangement makes it possible, for example, for the first member to be driven in the case of a relative movement of the members in a drive direction, which comprises it being possible for the first member to be fixed on the second member. Here, the fixing is to be understood to mean that, for example, the first member is driven when the second member moves in a drive direction. Secondly, this can also mean that the second member is driven in the case of a movement of the first member in a direction counter to the drive direction.

Instead of one driving section, each locking body member can also have a plurality of driving sections which engage at the same time into a plurality of tooth flanks of the coupling toothing system. For example, a locking body member can have two driving sections which engage into different (in particular, adjacent) tooth grooves of the coupling toothing system.

The coupling toothing system is preferably a radial toothing system with axially running teeth and tooth grooves, such as a splined shaft profile, a polygonal profile or a serrated toothing system, but can also be configured as an axial toothing system. The term of coupling toothing system is to be understood broadly, in particular in the sense of a toothing system, as is used for positively locking shaft/hub connections. Tooth flanks of the coupling toothing system are preferably configured as planar surfaces (in contrast to an involute toothing system). The coupling toothing system is preferably a spur toothing system.

In the release position, the locking body arrangement is preferably recessed completely in the second member, that is to say preferably does not project beyond the external diameter of the second member, with the result that the coupling toothing system does not make contact with the locking body carrier and the locking body member.

The first member and the second member can preferably be moved in two directions relative to one another when the locking body arrangement is in the release position. In the coupling position, the relative movability is restricted at least to one direction.

The object is therefore achieved completely.

The members of the coupling arrangement can both be mounted movably, or one of the members can be fixed on the housing. The members can comprise at least one linearly movable member.

In accordance with one preferred embodiment, one of the members is a rotary member which can be rotated relative to the other one, the other member preferably being formed by way of the housing or being fixed on the housing.

In the case of said embodiment, for example, the one rotary member can rotate freely in relation to the first member in the release position and is held fixedly on the other member in the rotational direction in the coupling position. A configuration of this type is advantageous, for example, in gear mechanism units, in the case of which a rotary member such as a planetary gear member (for example, a sun gear or an internal gear) is to be fixed in relation to a housing such as a bicycle gear mechanism housing, in order for it to be possible for power to be transmitted via the other members of the planetary gear set.

It is particularly preferred, however, if the first member and/or the second member are/is a rotary member which can be rotated about a rotational axis, the coupling arrangement serving to connect the first and the second member fixedly to one another so as to rotate together in one direction, the drive direction being a drive rotational direction.

It is particularly preferred if the two members are configured as rotary members, in particular in the form of an idler gear in the form of a first member which can be rotated on a gear mechanism shaft of a gear mechanism unit, the gear mechanism shaft forming a second rotary member which can be rotated about the rotational axis in relation to a housing of the gear mechanism unit. In the case of said embodiment, in the coupling position, the idler gear is connected to the shaft in the drive rotational direction, in particular is connected in a positively locking manner. In the release position, the idler gear and the shaft are not connected to one another, in such a way that the shaft can be rotated in the drive rotational direction, without driving the idler gear in the process.

If the first member is a rotary member, the coupling toothing system is preferably an axial toothing system which is oriented parallel to the rotational axis.

In the case of setting up of the coupling position, a drive force is transmitted from the second member to the locking body carrier, and the drive force is transmitted by the locking body carrier further to the locking body member which then transmits the force to the first member. It is preferred here if the locking body arrangement is supported by means of a supporting member in the coupling position with respect to pivoting in the direction of the release position.

It is particularly preferred if the locking body carrier is supported in the coupling position by means of a supporting member with respect to pivoting in the direction of the release position.

Said measure can achieve a situation where the transmission of force can take place from the second member to the first member, without the two-member locking body arrangement "collapsing".

In other words, the transmission of force can take place without a relative angle changing between an axis of the locking body carrier and an axis of the locking body member, that is to say, in particular, without the locking body carrier and the locking body member being pivoted with respect to one another.

The supporting member is preferably arranged radially within the locking body arrangement.

Here, it is particularly preferred if the supporting member can be moved between a supporting position, in which it supports the locking body carrier and/or the locking body arrangement, and a decoupling position, in which the supporting member permits pivoting of the locking body carrier and/or the locking body arrangement into the release position.

The supporting member can preferably be rotated relative to the second member, with the result that firstly it can be moved into the supporting position, in the case of which a transmission of force can take place from the second member via the two-member locking body arrangement to the first member. Secondly, a relative position can be set up between the supporting member and the second member, in the case of which relative position the locking body arrangement can pass into the release position or can remain in it, in order to set up the release position in this way.

The supporting member can be arranged, for example, on a shifting pin, as is disclosed in document EP 2 379 402 B1, or on a camshaft which has a comparable function.

It is generally conceivable that the locking body carrier and the locking body member are oriented in one axis with one another in the coupling position, and an angle between a locking body carrier axis and a locking body member axis is therefore 180° in the coupling position. In this case, in order to transfer the locking body arrangement into the release position, it is preferred if a certain impetus is exerted on the locking body arrangement, which impetus leads to the locking body carrier and the locking body member being pivoted with respect to one another in such a way that said angle becomes less than 180° depending on the angular function. Here, the angle which is also called the force transmission angle in the present case is preferably measured on a side of the locking body carrier axis and the locking body member axis, which side faces away from the supporting member. Here, the opposite angle which corresponds to the force transmission angle is greater than 180° on account of the pivoting. Here, the opposite angle faces the supporting member.

It is particularly preferred, however, if, in the coupling position, a force action line is set up between (i) a locking body carrier pivot axis, which is set up in the coupling position between the second member and the locking body carrier, and (ii) an engagement point, at which the driving section of the locking body member acts on the coupling toothing system, a locking body member pivot axis which is set up in the coupling position between the locking body member and the locking body carrier lying offset radially with respect to the force action line in the coupling position, preferably lying radially within the force action line.

In the case of said refinement, it is preferred if, in the coupling position, the locking body arrangement is supported by means of a supporting member with respect to pivoting in the direction of the release position, as described above.

In this way, a transmission of force can take place from the second member via the locking body carrier and the locking body member to the first member, without the locking body arrangement collapsing. In contrast, as soon as the supporting member is moved into the decoupling position, the locking body arrangement is compressed in the circumferential direction between the second member and the first member in such a way that the locking body member and the locking body carrier are pivoted against one another, and the locking body member pivot axis is offset radially, to be precise is preferably offset radially to the inside, with the result that force can no longer be transmitted between the second member and the first member.

Said state can be utilized in order to move the locking body arrangement overall into the release position.

In the case of said refinement, it is particularly preferred if,
- in the coupling position, a spacing between the force action line and the locking body member pivot axis is greater than 0 mm and is smaller than 5 mm, preferably smaller than 1 mm, and/or if,
- in the coupling position, a ratio between (i) a spacing between the force action line and the locking body member pivot axis and (ii) a spacing between the locking body member pivot axis and the locking body carrier pivot axis is smaller than 1:4 and greater than 0, preferably smaller than 1:10, and/or if,
- in the coupling position, a ratio between (i) a spacing between the force action line and the locking body member pivot axis and (ii) a spacing between the locking body member pivot axis and the engagement point is smaller than 1:4 and greater than 0, preferably smaller than 1:10.

Each individual one of the abovementioned three measures or any desired combination thereof can achieve a situation where high forces can be transmitted from the first member in the drive direction to the second member, although, on account of the force ratios, only a low supporting force in a direction transversely with respect thereto is required for this purpose.

Accordingly, a frictional engagement between the locking body arrangement and/or the locking body carrier and a supporting member can be kept low. As a consequence, it is possible by way of relatively small forces to move the supporting member from a supporting position into a decoupling position, to be precise while a high force is still being transmitted from the second member to the first member. Overall, the kinematics of the coupling arrangement can be optimized.

Overall, it is preferred if, in the coupling position, the locking body carrier is oriented along a locking body carrier axis, the locking body member being oriented along a locking body member axis in the coupling position, the locking body carrier axis and the locking body member axis being oriented in the coupling position at a force transmission angle of greater than or equal to 150° and less than 180° with respect to one another.

It is particularly preferred if the force transmission angle in the coupling position is greater than or equal to 160°, preferably greater than or equal to 165°, in particular greater than or equal to 170°.

As a result of said measure, a locking body member pivot axis can be arranged close to a force action line between a locking body carrier pivot axis and an engagement point of the driving section on the coupling toothing system. As a consequence, said measure likewise contributes to it being possible for high forces to be transmitted in the drive direction from the second member to the first member, to be precise in the case of low supporting forces in a direction transversely with respect thereto.

Furthermore, it is advantageous overall if, in the coupling position, the locking body member can be pivoted out of a locking body member coupling position into a freewheel position.

In the case of said embodiment, the locking body carrier can still remain in its locking body carrier coupling position, that is to say, in particular, can be held, for example, by way of a supporting member in the locking body carrier coupling position. Nevertheless, the first member can "overtake" the second member, the freewheel action occurring by the locking body member being moved out of its coupling position into a freewheel position, in which the locking body member lies within a transition area between the first member and the second member. Here, the locking body member can be pivoted by the teeth of the coupling toothing system in each case into the freewheel position.

Here, the locking body carrier and the locking body member are preferably coupled to one another, in particular coupled elastically, in such a way that the locking body member is generally prestressed out of the freewheel position toward the coupling position of the locking body member.

In other words, the coupling action between the locking body carrier and the locking body member is preferably such that the locking body member is pressed in the direction of a locking body member coupling position with respect to the locking body carrier which is situated in the coupling position. As a consequence, the locking body member will always attempt here to engage into the tooth gaps of the coupling toothing system. In the case of a reversal of the relative rotational directions, the locking body member will therefore preferably engage again into the coupling toothing system, in order for it to be possible for the first member to be driven in the case of a relative movement of the members in a drive direction.

In accordance with a further preferred embodiment, the locking body member is prestressed on the locking body carrier into a neutral position, from which the locking body member can be pivoted in two opposed directions in relation to the neutral position.

Therefore, the coupling position can be set up by way of pivoting toward the coupling toothing system. Pivoting in the opposite direction makes it possible that, when the locking body carrier is situated in a locking body carrier coupling position, a freewheel position of the locking body member can be set up.

The pivoting angle of the locking body member is limited at least in one direction in relation to the locking body carrier, preferably by way of holding lugs of the locking body carrier (see below).

The prestress of the locking body member on the locking body carrier into a neutral position is preferably realized by means of a spring arrangement. The spring arrangement preferably acts between the locking body member, in particular a locking body member head of the locking body member, and a pin arrangement which is mounted on the locking body carrier such that it can be displaced in the drive direction. Here, the pin arrangement is pressed by the spring arrangement within the locking body carrier against a stop in such a way that a part of the pin arrangement passes out of the locking body carrier in the direction of a joint socket of the second member.

In the case of said embodiment, the spring arrangement preferably has both the function of prestressing the locking body member into its neutral position on the locking body carrier; secondly, the spring arrangement also has the function of prestressing the locking body carrier on the joint socket of the second member into a basic position which preferably corresponds to the release position of the locking body carrier.

In accordance with a further overall preferred embodiment, at a first end, the locking body carrier has a locking body carrier head which is assigned to a joint socket of the second member, in order to form a first pivoting bearing between the second member and the locking body carrier.

Here, the locking body carrier head is preferably received in the joint socket in the manner of a curved joint, in such a way that a locking body carrier pivot axis is not necessarily fixed in relation to the second rotary member. The remaining degree of freedom can be used to realize different functions of the coupling arrangement.

The interaction between the locking body carrier head and the joint socket of the second member, however, is preferably such that a force can always be transmitted in the drive direction from the second member to the locking body carrier regardless of the relative pivoting position of the locking body carrier in relation to the second member.

Furthermore, it is advantageous overall if, at a second end, the locking body carrier has a locking body carrier socket which is assigned a locking body member head of the locking body member, in order to form a second pivoting bearing between the locking body carrier and the locking body member.

The interaction between the locking body carrier socket and the locking body member head is also such that a curved joint is set up. A force can preferably be transmitted in the drive direction, however, regardless of the relative pivoting position of the locking body member in relation to the locking body carrier.

It is particularly advantageous here if the locking body carrier has at least one holding lug which engages over the locking body member head, in order to hold the locking body member in the drive direction in relation to the locking body carrier. The holding lug can secondly also serve to hold the locking body carrier in relation to the locking body member when the first member drives the second member by way of the coupling toothing system.

The locking body carrier preferably has two holding lugs which lie opposite one another in the direction transversely with respect to the drive direction and engage over the locking body member head from opposite sides, in order to hold the locking body member in the drive direction in relation to the locking body carrier.

If the locking body member is prestressed on the locking body carrier into a neutral position, the locking body member head is preferably prestressed here against the holding lugs, with the result that a neutral position of the locking body member is set up in relation to the locking body carrier.

In accordance with a further preferred embodiment, the driving section is configured in such a way that the locking body arrangement is pressed into the coupling toothing system in the case of the transmission of a drive force from the second member to the first member and when the locking body arrangement is situated in the coupling position.

Here, a locking body member of the locking body arrangement preferably assumes a relative position in the coupling position with respect to the locking body carrier and/or with respect to a toothing system or a tooth flank of the coupling toothing system, such that the locking body arrangement is pressed with the locking body member into the coupling toothing system on account of the drive force, in particular a circumferential force, in the manner of a negative profile of a synchronizer shifting clutch toothing system of motor vehicle transmissions.

Said measure can ensure that the locking body member always remains in the coupling position regardless of a prestress of the locking body member on a locking body carrier, as long as a drive force is transmitted from the second member to the first member via the locking body arrangement.

In accordance with a further preferred embodiment, the driving section is configured in such a way that the locking body arrangement is pressed out of the coupling toothing system in the case of the transmission of a drive force from the second member to the first member and when the locking body arrangement is pivoted out of the coupling position in the direction of the release position.

As a consequence, as soon as the locking body arrangement has left the coupling position, to be precise preferably directly after this, the relative position between the driving section and the coupling toothing system preferably reverses in such a way that the driving section is no longer pressed into the coupling toothing system, but rather is pressed out of the latter.

As a result, pivoting of the locking body arrangement out of the coupling position into the release position is assisted.

In other words, in the transition position, the drive force is utilized, on account of the relative geometry of the driving section and the coupling toothing system, in the manner of a positive profile, to press the driving section out of the coupling toothing system as soon as the locking body arrangement has left the coupling position.

As a consequence, in the case of a two-member locking body arrangement, as soon as the locking body arrangement is no longer supported by means of a supporting member and, as a consequence, is compressed on account of the drive force (with the result that an angle between a locking body carrier axis and a locking body member axis is preferably reduced or an opposite angle is increased), the locking body member is pivoted against a stop on the locking body carrier. It then assumes a position in relation to the coupling toothing system which is such that the locking body member and, on account of the stop, the locking body arrangement overall are pressed out of the coupling toothing system by way of the drive force, preferably a circumferential force, and assists the disengaging of an associated gear stage as a consequence.

In accordance with a further preferred embodiment, the locking body carrier is held in a locking body carrier release position by means of an elastic spring device.

Here, the elastic spring device preferably acts on a joint socket of the second rotary member, which joint socket is designed in terms of the contour in such a way that the locking body carrier is held in its release position by means of the elastic spring device. For example, the locking body carrier can be in its release position when a supporting member is situated in a decoupling position. As soon as the supporting member is pivoted into a supporting position, the locking body carrier is preferably pivoted as a result out of the release position in the direction of the coupling position counter to the action of the elastic spring device.

Here, it is particularly preferred if the elastic spring device has a compression spring which acts between a pin, which bears against the second member, and the locking body member.

Here, said compression spring arrangement can have one compression spring, two compression springs or more compression springs which act in parallel. Here, the compression spring arrangement can firstly have the effect of prestressing the locking body carrier into its release position elastically. Secondly, the compression spring arrangement can have the effect of prestressing a locking element which is mounted on the locking body carrier into a neutral position, out of which the locking body member can be pivoted in two opposed directions with respect to the locking body carrier.

In accordance with a further overall preferred embodiment, the coupling arrangement comprises a camshaft which has a decoupling circumferential section and a coupling or supporting circumferential section, the locking body arrangement having a cam follower section which, in the release position, acts on the decoupling circumferential section and which, in the coupling position, acts on the supporting circumferential section.

Here, the cam follower section preferably acts on a locking body carrier of the locking body arrangement.

As mentioned at the outset, it is preferred if the locking body arrangement is configured in such a way that it can transmit a force in the drive direction, the locking body arrangement preferably being of two-member nature in such a way that the transmission of force has to be supported via a supporting member. In this case, the supporting member can be formed by way of the supporting circumferential section of the camshaft. Here, the supporting circumferential section preferably has a greater external diameter than the decoupling circumferential section. The supporting circumferential section and the decoupling circumferential section can adjoin one another in such a way that, in the case of a relative rotation of the camshaft with respect to the second member which is configured in the present case as a rotary member, preferably as a hollow shaft, the transition from the decoupling circumferential section to the supporting circumferential section can pivot the locking body carrier of the locking body arrangement out of its release position into a coupling position, to be precise preferably counter to the action of an elastic spring device.

Secondly, as soon as the cam follower section no longer acts on the supporting circumferential section, pivoting of the locking body carrier into the release position is permitted, which takes place, in particular, on account of a drive force between the first and the second member in the circumferential direction, which drive force leads to the preferably two-member locking body arrangement "collapsing", the angle between the locking body carrier and the locking body member decreasing.

Here, it is particularly preferred if the camshaft has a camshaft external diameter in the region of the decoupling circumferential section, the second member having a rotary member external diameter, the ratio of the camshaft external diameter to the rotary member external diameter lying in a range from 0.15 to 0.5, in particular being smaller than 0.4 and preferably being smaller than 0.35.

Therefore, the camshaft is relatively small in terms of the external diameter in relation to the external diameter of the second member which is preferably configured in the present case as a rotary member, in particular as a hollow shaft, within which the camshaft is arranged.

A ratio of an external diameter of the supporting circumferential section to the rotary member external diameter preferably lies in a range of less than 0.7, preferably less than 0.6 and, in particular, less than 0.5.

Said ratio can also contribute to the force between the locking body carrier and the supporting member or the supporting circumferential section being relatively low, even when a high force is transmitted in the drive direction via the locking body arrangement.

Furthermore, it is particularly preferred if the locking body carrier is supported by way of a cam follower section on the supporting circumferential section of the camshaft, the cam follower section being spaced apart in the circumferential direction from a locking body carrier pivot axis by at least 45°, preferably at least 60°. As an alternative or in addition, it is preferred if the cam follower section lies in the circumferential direction between a locking body carrier pivot axis and a locking body member pivot axis, but is preferably spaced apart from a locking body member pivot axis in the direction of an engagement point on the coupling toothing system and beyond this, that is to say is spaced apart further from the locking body carrier pivot axis in the circumferential direction than the engagement point in the coupling toothing system is spaced apart from the locking body carrier pivot axis.

It is preferably provided in the gear mechanism unit that a plurality of locking body arrangements of the above-described type are arranged on the gear mechanism shaft, in accordance with the number of gearwheels which are mounted on the gear mechanism shaft, are configured as idler gears, and in each case have a coupling toothing system on their inner circumference.

Here, the locking body arrangements on the gear mechanism shaft are preferably offset axially, in accordance with the arrangement of the idler gears, and are preferably also arranged offset in the circumferential direction, in order to distribute the recesses in the gear mechanism shaft for receiving the locking body arrangements uniformly, with the result that the gear mechanism shaft overall is weakened uniformly on account of the recesses and is not weakened locally.

The gear mechanism shaft is preferably driven by way of muscle power. It generally goes without saying in the present case that a vehicle which is driven by way of muscle power can also be an e-bike, in the case of which the muscle power is assisted by way of drive force of an electric motor.

Changing of the gear stages takes place by way of relative rotation of the camshaft in relation to the gear mechanism shaft. The camshaft is configured in such a way that it has a supporting circumferential section which is arranged offset axially for each locking body arrangement, with the result that, in the case of each relative rotational position, one of the locking body arrangements is moved out of the release position into the coupling position, in order to connect the associated idler gear fixedly to the gear mechanism shaft in the drive direction so as to rotate with it.

In the case of a gear change, the camshaft is rotated in such a way that the supporting circumferential section of another idler gear (for the target gear stage) moves the associated cam follower section of the locking body arrangement of the target idler gear out of the release position into the coupling position.

In the case of an upshift into a higher target gear stage and/or a downshift into a lower target gear stage, however, the locking body arrangement of the source gear stage (that is to say, that gear stage which is to be disengaged) remains in engagement on account of the circumferential force which still exists (after all, shifting is to take place under load, that is to say without an interruption of the tractive force). The disengaging of said source gear stage then takes place simply by virtue of the fact that the supporting circumferential section of the camshaft, which supporting circumferential section is assigned to the source gear stage or the source idler gear, is rotated in such a way that it no longer supports the cam follower section of the locking body arrangement of the source idler gear. Since the circumferential force still acts in the drive direction, this leads to automatic disengaging of the source gear stage, since the two-member locking body arrangement "collapses" on account of the circumferential force, by the locking body member pivot axis being deflected radially inward on account of the compression of the driving section firstly and the locking body carrier head secondly, to be precise on account of the absence of support. Here, the adaptation of the driving section and the coupling toothing system preferably assists the locking body member being pressed out of the coupling toothing system from this time, in such a way that the rotationally locked connection between the gear mechanism shaft and the idler gear of the source gear stage is canceled, and the circumferential force which is still exerted on the gear mechanism shaft is subsequently diverted to the coupling toothing system of the idler gear which is assigned to the target gear stage.

As a consequence, the coupling arrangement is realized multiple times in a gear mechanism unit such as described above. The coupling arrangement makes gear changing of the gear mechanism unit under load possible, to be precise, in particular, in the case of a downshift operation.

In the case of a downshift operation, the target gearwheel has a lower rotational speed (freewheel) in relation to the shaft. The source gearwheel with the higher rotational speed remains in engagement. A pawl which is assigned to the source gearwheel in the prior art would then not be released on account of this. By way of the coupling arrangement, however, the engagement between the source gearwheel and the associated shaft can be released.

In the case of an upshift, the reverse is the case. The target gearwheel has a higher rotational speed than the shaft and passes directly into the engagement in the case of pivoting out of the locking body arrangement. The source gearwheel then passes immediately into the freewheel, and the locking body arrangement which is assigned to the source gearwheel is relieved of load and, as a consequence, can also be released comparatively simply in the prior art.

It goes without saying that the features which are mentioned in the above text and those still to be described in the following text can be used not only in the respective specified combination, but rather also in other combinations or on their own, without departing from the scope of the present invention.

BRIEF DESCRIPTION OF THE DRAWINGS

Exemplary embodiments of the invention are shown in the drawing and will be described in greater detail in the following description. In the drawing:

FIG. 3 shows a diagrammatic gear change schematic of a gear change arrangement for changing gear stages of a gear mechanism unit, to be precise with a first camshaft for a first part gear mechanism and a further camshaft for a second part gear mechanism, and respective superimposition gear mechanisms, FIG. 4 shows a perspective illustration of a gear mechanism shaft for a gear mechanism unit, with a plurality of locking body arrangements which are arranged thereon and are assigned in each case to an idler gear which is mounted rotatably on the gear mechanism shaft, of which locking body arrangements one is shown in FIG. 4, FIG. 17 shows an exploded illustration of the countershaft of FIG. 4 together with a camshaft, FIG. 18 shows the camshaft of FIG. 17 in an exploded illustration, FIG. 19 shows a driver arrangement of the camshaft of FIG. 18 in a first position, FIG. 20 shows the driver arrangement of FIG. 19 in a second position, FIG. 21 shows the driver arrangement of FIG. 19 in a third position, FIG. 22 shows a diagrammatic illustration of a gear mechanism hub which is fixed on the housing and on which a sun gear of a planetary gear set is mounted rotatably.

EMBODIMENTS

Figure 1:
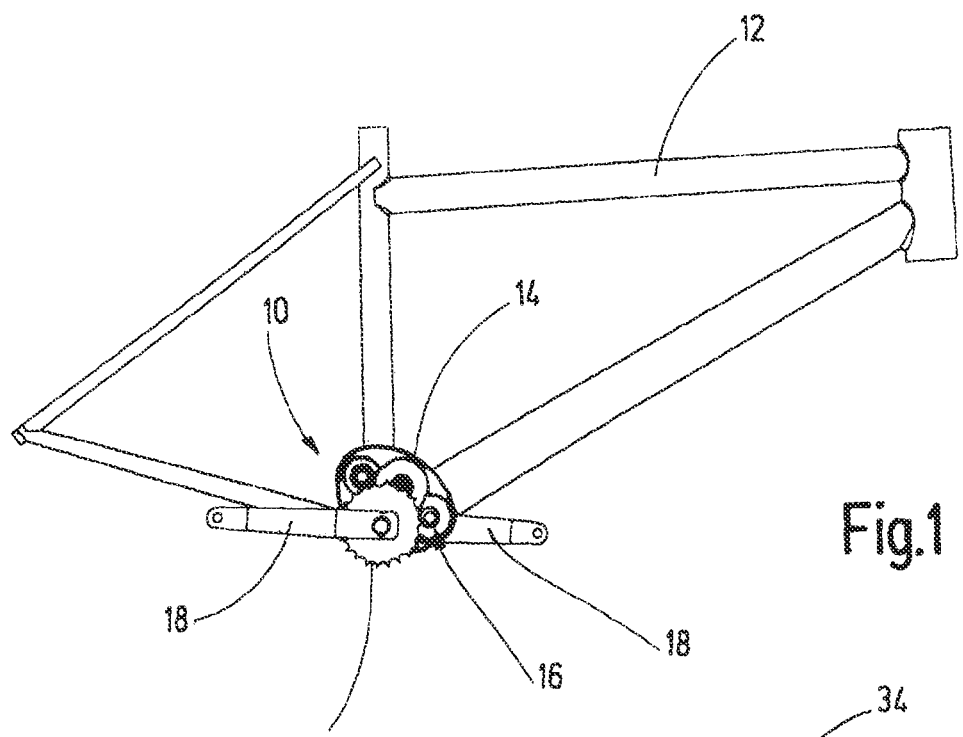
FIG. 1 diagrammatically shows a gear mechanism unit which is integrated into a bicycle frame of a vehicle, the gear mechanism unit forming a multiple gear mechanism.

In FIG. 1, a gear mechanism unit is denoted overall by 10.

FIG. 1 shows a side view of a vehicle frame 12 which has a gear mechanism housing 14, in which the gear mechanism unit 10 is received. The gear mechanism unit 10 is indicated merely diagrammatically in said illustration and is configured as a compact unit which is preferably arranged in a gear mechanism cage (not shown here). The gear mechanism unit 10 will be described herein by way of example for use in the case of a bicycle, the use in other vehicles which are operated by way of muscle power also being possible, however. Furthermore, it is also conceivable to use the gear mechanism unit 10 for vehicles, in the case of which muscle power is used in combination with a drive machine to drive the vehicle, such as an electric machine which is used for electric motor assistance. It is also conceivable to use the gear mechanism unit for vehicles which are driven purely by electric motor, or else by internal combustion engine.

Together with cranks 18, the gear mechanism unit 10 and the gear mechanism housing 14 form a multiple gear mechanism 16, a gear mechanism input shaft being arranged coaxially with respect to a drive pinion 20. The drive pinion 20 serves, for example, to drive a traction mechanism such as a chain or a toothed belt which, furthermore, is connected to a rear wheel pinion, in order in this way to transmit drive power, which is introduced via the pedal cranks 18, to the rear wheel via the multiple gear mechanism 16 in a stepped-down or stepped-up manner, in order to drive the vehicle in this way.

Figure 2:
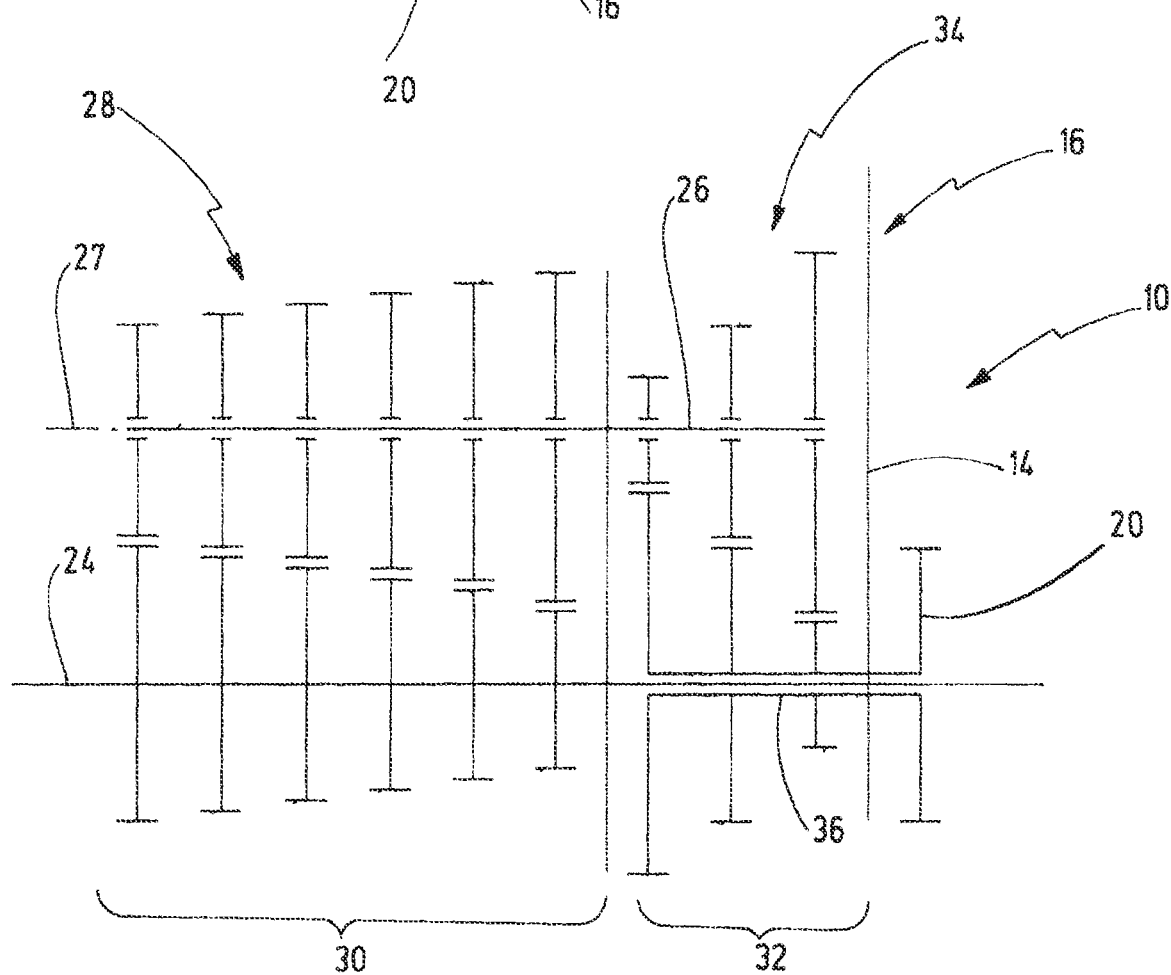
FIG. 2 shows a diagrammatic gear change schematic of a multiple gear mechanism with two part gear mechanisms and a common countershaft, as can be used in a gear mechanism unit of FIG. 1.

FIG. 2 diagrammatically shows a gear change schematic of a gear mechanism unit 10 which comprises a multiple gear mechanism 16.

The gear mechanism unit 10 has an input shaft 24 which can be connected fixedly to the cranks 18 so as to rotate with them and, as a consequence, is configured as a crankshaft. Furthermore, the gear mechanism unit 10 has a countershaft 26 which is arranged offset in parallel with respect to the input shaft 24 and forms a second rotary member in the present context. The countershaft 26 is oriented concentrically with respect to a rotational axis 27.

The gear mechanism unit 10 has a plurality of first gear sets 28 which are assigned to a first gear mechanism group 30. The first gear sets 28 in each case have a fixed gear, which is connected fixedly to the input shaft 24 so as to rotate with it, and an idler gear, which is mounted rotatably on the countershaft 26.

Furthermore, the gear mechanism unit 10 comprises a second gear mechanism group 32 which has a plurality of second gear sets 34. The second gear sets 34 in each case have an idler gear, which is mounted rotatably on the countershaft 26, and a fixed gear, which is connected fixedly to a hollow shaft 36 so as to rotate with it, which hollow shaft 36 is arranged concentrically with respect to the input shaft 24 and forms an output shaft of the gear mechanism unit 10. The drive pinion 20 is connected fixedly to the hollow shaft 36 so as to rotate with it.

The input shaft 24 is configured as an axial through shaft. The drive pinion 20 forms an output member of the gear mechanism unit 10. The countershaft 26 forms an output shaft for the first gear mechanism group 30 and an input shaft for the second gear mechanism group 32.

In the present case, the number of first gear sets 28 is equal to six. The number of second gear sets 34 is equal to three.

The two gear mechanism groups 30, 32 are arranged behind one another in the power flow direction, in such a way that a multiple gear mechanism 16 with a total of eighteen gear stages (six times three) is formed by means of the gear mechanism unit 10. The transmission ratios of the individual gear sets 28, 34 can be selected in such a way that the eighteen gear stages can be stepped in a constant manner from a low gear stage 1 as far as a highest gear stage 18, for example with an overall transmission ratio or spread of 636% in the case of a constant step spacing of 11.5%.

In one alternative embodiment, the first gear mechanism group 30 can have five gear sets, and the second gear mechanism group 32 can have four gear sets, with the result that a total of twenty gear stages with an even higher spread can be realized.

In the case of the two variants, it is generally conceivable that the input shaft 24 is connected directly to the output shaft 36 by means of a gear change apparatus (not shown in greater detail), in order to set up an additional direct gear.

In order to set up a gear stage, in each case two idler gears are to be connected to the countershaft 26 by virtue of the fact that the multiple gear mechanism 16 is formed by way of two gear mechanism groups 30, 32; to be precise, one idler gear of the first gear mechanism group 30 and one idler gear of the second gear mechanism group 32.

A gear change apparatus (not shown in greater detail in FIG. 2) which comprises a coupling arrangement for each idler gear serves to connect the idler gears fixedly to the countershaft 26 so as to rotate with it. It is generally provided that the idler gears in each case have a radially inner coupling toothing system. Furthermore, it is provided that a locking body arrangement is mounted on the countershaft 26 for each idler gear. Each locking body arrangement can be pivoted between a coupling position, for connecting the countershaft to the respective idler gear in a drive rotational direction, and a release position, in the case of which the locking body arrangement does not engage into the associated coupling toothing system, that is to say the associated idler gear is not connected fixedly to the countershaft 26 so as to rotate with it in the drive direction.

It is provided in the present case that the locking body arrangement here has a locking body carrier which is mounted pivotably on the countershaft 26, and has a locking body member which is mounted pivotably on the locking body carrier and on which a driving section is configured which, in the coupling position, engages into the coupling toothing system of the associated idler gear and, in the release position, does not engage into the coupling toothing system.

FIG. 3 diagrammatically shows a gear mechanism unit 10' which can correspond with regard to construction and method of operation to the gear mechanism unit of the above-described type, and which can be shifted by means of a gear change apparatus 40. Identical elements as in FIGS. 1 and 2 are provided with corresponding designations.

The gear change apparatus 40 has a first camshaft 42 and a second camshaft 44 coaxially with respect to a countershaft 26'. The countershaft 26' is configured as a hollow shaft. The camshafts 42, 44 are arranged therein coaxially with respect to it. The first camshaft 42 is assigned to a first gear mechanism group 30'. The second camshaft 44 is assigned to a second gear mechanism group 32'.

The changing of gears of the gear mechanism unit 10' generally takes place as follows. The camshafts 42, 44 are driven in each case at a rotational speed which is as a rule identical to that of the countershaft 26'. In order to engage and disengage gears, the respective camshaft 42, 44 is rotated relative to the countershaft 26', as a result of which a respective coupling arrangement of a target gear stage passes into a coupling position, whereas coupling arrangements of other gear sets pass into a release position, in such a way that in each case only one idler gear of a gear mechanism group is connected fixedly to the countershaft 26' so as to rotate with it in the drive direction.

A first superimposition gear mechanism 46 and a second superimposition gear mechanism 48 serve to set up a rotational speed uniformity between the respective camshafts 42, 44 and the countershaft 26'.

The first and the second superimposition gear mechanisms 46, 48 share a common auxiliary shaft gear set 50 which comprises a fixed gear which is connected to the countershaft 26' and a further fixed gear which is connected to an auxiliary shaft 52 which is arranged offset in parallel with respect to said countershaft 26'. The auxiliary shaft 52 therefore always rotates at a rotational speed which is proportional to that of the countershaft 26'.

The first superimposition gear mechanism 46 has a first planetary gear set 54 which comprises a first internal gear 56, a first planetary carrier 58 and a first sun gear 60. The first sun gear 60 is connected fixedly to the auxiliary shaft 52 so as to rotate with it. The first internal gear 56 is connected fixedly to a first gear change shaft 62 so as to rotate with it, which first gear change shaft 62 is configured concentrically with respect to the auxiliary shaft 52 in the form of a hollow shaft. A first traction disk 64 is fixed on the first gear change shaft 62. The first gear change shaft 62 is mounted rotatably on a first superimposition shaft 66. The first superimposition shaft 66 is firstly connected fixedly to the first planetary carrier 58 so as to rotate with it. Secondly, the first superimposition shaft 66 of the first superimposition gear mechanism 46 is connected via a first superimposition gear set 68 to the first camshaft 42.

The auxiliary shaft gear set 50 is arranged substantially centrally in relation to the longitudinal extent of the gear mechanism unit 10'. The first superimposition gear set 68 is arranged at a first axial end of the gear mechanism unit 10'. The first camshaft 42 extends from the first axial end in the axial direction into the countershaft 26'. The first planetary gear set 54 and the first gear change shaft 62 with the first traction disk 64 are arranged in the axial direction between the auxiliary shaft gear set 50 and the first superimposition gear set 68.

The second superimposition gear mechanism 48 is of substantially mirror-symmetrical configuration with respect to the first superimposition gear mechanism 46 and comprises a second planetary gear set 70. The second planetary gear set 70 has a second internal gear 72, a second planetary carrier 74 and a second sun gear 76. The second sun gear 76 is connected fixedly to the auxiliary shaft 52 so as to rotate with it.

The second internal gear 72 is connected fixedly to a second gear change shaft 78 so as to rotate with it, on which second gear change shaft 78 a second traction disk 80 is fixed. The second gear change shaft 78 is mounted rotatably in relation to a second superimposition shaft 82 which is connected fixedly to the second planetary carrier 74 so as to rotate with it. The second superimposition shaft 82 is connected by means of a second superimposition gear set to the second camshaft 44. The second superimposition gear set 84 is arranged at the opposite second axial end of the gear mechanism unit 10'. The second camshaft 44 extends from said opposite axial end in the axial direction into the countershaft 26'.

The traction disks 64, 80 are connected to respective actuating levers which, for example, are arranged on the handlebar of a bicycle. The connection can take place via Bowden cables or the like.

In the case of an engaged gear stage, the traction disks 64, 80 are held fixedly in each case in such a way that a rotation of the auxiliary shaft 52 which is proportional to the rotation of the countershaft 26' is converted into a rotation of the respective superimposition shaft 66, 82, to be precise proportionally with respect thereto, the rotation of which is in turn converted proportionally via the respective constant gear sets 68, 84 into a rotation of the respective camshaft 42, 44 which is identical in each case to the rotational speed of the countershaft 26'. If the one and/or the other traction disk 64, 80 are/is rotated, the associated camshaft 42, 44 is rotated relative to the countershaft 26' proportionally with respect to the former rotation. This leads to coupling arrangements which are not denoted in greater detail and are assigned to the gear sets 28 and 34 of the gear mechanism groups 30', 32' being removed from the power flow or switched into the power flow.

The gear change apparatus 40 which is described above in relation to FIG. 3 is also described in detail in document EP 2 379 402 B2. In the present case, reference is made to the full scope of the disclosure contents of said document. A further gear change apparatus, in the case of which a superimposition gear mechanism is arranged coaxially, is known from document EP 2 512 909 A1. In the present case, reference is also made to the full scope of the disclosure contents of said document.

FIG. 4 diagrammatically shows a part of a gear mechanism unit 10" which can correspond with regard to construction and method of operation to the above-described gear mechanism units, to be precise with a gear change apparatus 40" on the basis of a perspective view of a countershaft 26", on which an exemplary idler gear 88 is mounted rotatably. The idler gear 88 can be, for example, part of a first gear mechanism group 30, that is to say part of a gear set of the gear sets 28. For reasons of clarity, further gear sets of the first gear sets 28" are not shown in FIG. 4. Furthermore, the second gear sets 34 of the second gear mechanism group 32 are also not shown. It can be seen that the first camshaft 42" extends from one side and axially into the countershaft 26". The other, second camshaft 44" is not shown in FIG. 4 for reasons of clarity.

A plurality of (in the present case six) locking body arrangements 90 are mounted on the countershaft 26", which locking body arrangements 90 are in each case assigned to an idler gear of the first gear mechanism group 30 and of which four are shown in FIG. 4 (the others lie on a rear side which is not shown). The locking body arrangements 90 of the first gear mechanism group 30 are arranged offset axially with respect to one another and are arranged on one side of the countershaft 26". Furthermore, a plurality of locking body arrangements 90a are mounted pivotably on the countershaft 26", which locking body arrangements 90a are assigned to idler gears of the second gear mechanism group 32, in the present case three locking body arrangements 90a (of which two are shown in FIG. 4).

A plurality of 6×3=18 gear stages can thus be realized by way of a gear mechanism of this type. In practice, however, the number of locking body arrangements 90 and 90a which are arranged on the countershaft 26" can also be lower or higher, with the result that twelve, sixteen, eighteen, twenty or more gear stages can be realized.

The locking body arrangements 90 are mounted in each case in radial recesses 92 in the countershaft 26", the radial recesses 92 being configured in the radial direction as through recesses.

The locking body arrangements 90, 90a can be pivoted in each case out of a release position (shown in each case in FIG. 4) into a coupling position. In the release position, the locking body arrangements 90, 90a are arranged in each case radially within an outer circumference of the countershaft 26", in such a way that an idler gear which is assigned to the respective locking body arrangement 90, 90a can be rotated freely in relation to the countershaft 26".

If a locking body arrangement 90 and/or 90a is moved into a coupling position, the respective locking body arrangement 90, 90a is moved radially to the outside with respect to the outer circumference of the countershaft 26", in such a way that said locking body arrangement 90, 90a engages into a coupling toothing system 94 of the associated idler gear 88.

Furthermore, FIG. 4 shows a usual drive rotational direction 96, in which the countershaft 26" is moved when drive power is transmitted from the input shaft 24 via a gear set with the idler gear 88 to the countershaft, from where drive power is then transmitted via a further idler gear (not shown) of the second gear mechanism group toward an output shaft 36. The countershaft 26" therefore drives an idler gear (not shown) for the second part gear mechanism 32, whereas the idler gear 88 drives the countershaft 26" for the first gear mechanism group.

Each locking body arrangement 90 forms a coupling arrangement 100 together with the countershaft 26" or its associated radial recess 92 and the coupling toothing system 94 of the associated idler gear 88. In the present case, nine coupling arrangements 100 are provided for the countershaft 26", of which coupling arrangements 100 one is shown substantially completely. A cross section which is shown in FIG. 5 is also drawn through said coupling arrangement 100.

Figure 5:
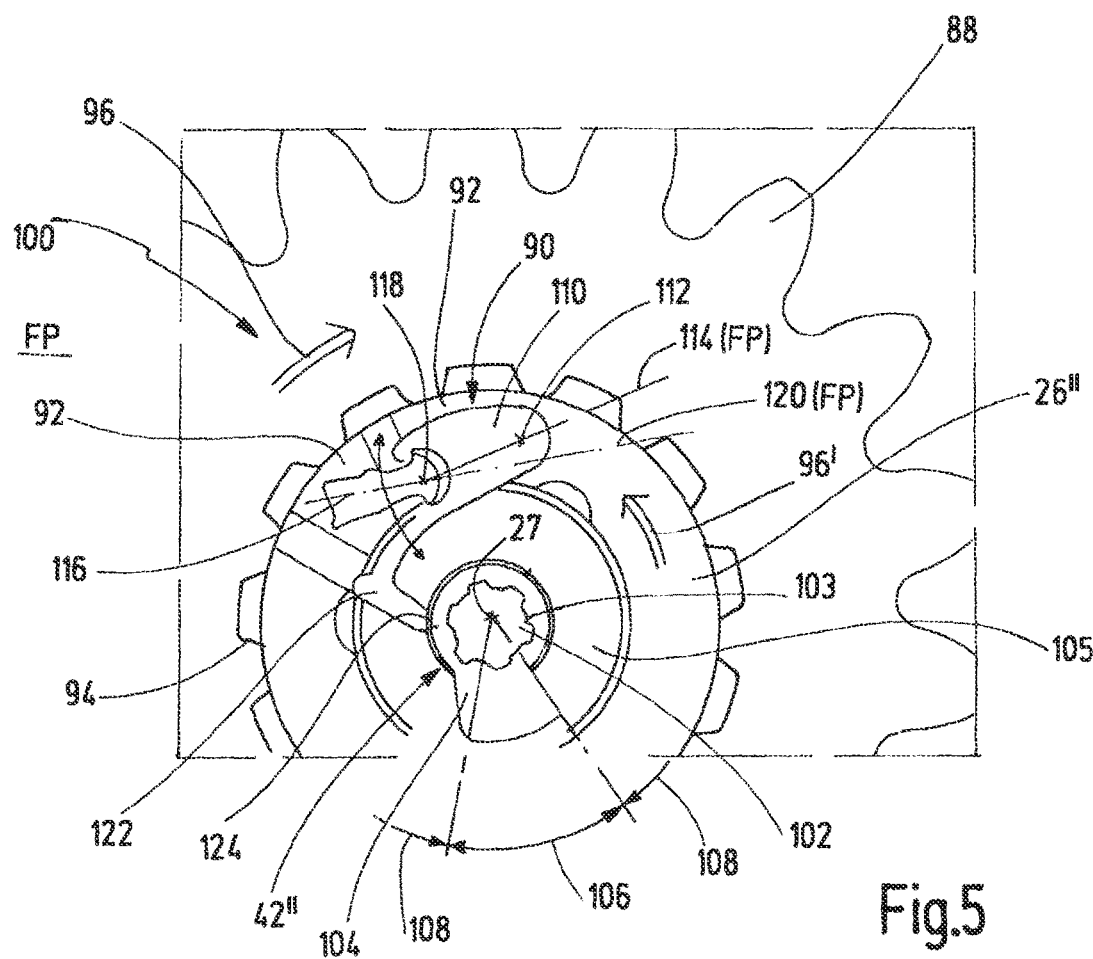
FIG. 5 shows a diagrammatic sectional view along the line of V-V of FIG. 4 with an illustration of a gear mechanism shaft in the form of a countershaft, a camshaft which is arranged concentrically therein, and with an idler gear which is mounted on the outside of the gear mechanism shaft and can be connected to the gear mechanism shaft in the drive direction by means of a coupling arrangement, the coupling arrangement having a locking body arrangement which is situated in a release position in FIG. 5.

FIG. 5 shows that the idler gear 88 has an axially oriented coupling toothing system 94. The countershaft 26" is arranged radially within the coupling toothing system 94. The countershaft 26" is configured as a hollow shaft. In the present case, the first camshaft 42" can be seen radially within the countershaft 26". It is shown in the present case that the countershaft 26" is driven by means of the idler gear 88 in a drive direction 96. Drive power can likewise be transmitted, however, from the countershaft 26" in the opposite direction 96' to the idler gear.

The first camshaft 42" has a cam carrier shaft 102 which is provided with an axial external toothing system 103. A camshaft bearing disk 105 and a cam 104 are pushed onto the cam carrier shaft 102, which cam 104 is aligned axially with the coupling arrangement 100. The cam or the cam body has a decoupling circumferential section 108 which extends over more than 300°, and a supporting circumferential section 106. The supporting circumferential section 106 has a greater external diameter than the decoupling circumferential section 108. The camshaft bearing disk 105 supports the cam carrier shaft 102 radially in the countershaft 26".

The locking body arrangement 90 has a locking body carrier 110. The locking body carrier 110 is received in the radial recess 92, to be precise in such a way that a rotation of the countershaft 26" in the drive rotational direction 96' can transmit a circumferential force to the locking body carrier 110. Here, the locking body carrier 110 is mounted on the countershaft 26" such that it can be pivoted about a locking body carrier pivot axis 112 which runs parallel to the rotational axis 27. The locking body carrier 110 extends from an axial end, at which the locking body carrier 110 is received in a joint socket of the countershaft 26" (that is to say, a correspondingly formed radial wall of the radial recess 92), in the circumferential direction as far as a second end, at which a locking body member 116 is mounted pivotably, to be precise about a locking body member pivot axis 118. Here, the locking body carrier 110 extends substantially along a locking body carrier axis 114 which in the present case runs through the locking body carrier pivot axis 112 and the locking body member pivot axis 118.

The locking body member pivot axis 118 is oriented in parallel with respect to the locking body carrier pivot axis 112.

The locking body member 116 is prestressed by means of an elastic device (not shown in greater detail) in relation to the locking body carrier 110 into a neutral position, in the case of which the locking body member 116 extends along a locking body member axis 120 which is oriented at an angle with respect to the locking body carrier axis 114. The elastic device denoted above or a further elastic device additionally prestresses the locking body carrier 110 into the position which is shown in FIG. 5 and in the case of which the locking body carrier 110 is situated in a release position FP, and in the case of which the locking body member 116 which is mounted pivotably thereon is situated in the neutral position. In said release position, as viewed radially, the entire locking body arrangement 90 lies within the outer circumference of the countershaft 26" and, as a consequence, does not engage into the coupling toothing system 94. It can be seen in FIG. 5, however, that the locking body carrier 110 can be pivoted radially outward out of the release position which is shown in FIG. 5, and that the locking body member 116 can be pivoted on the locking body carrier in two directions with respect to the neutral position which is shown.

The locking body carrier 110 has a cam follower section 122 which, in the release position FP which is shown, bears against the decoupling circumferential section 108 of the cam body 104. The cam follower section 122 can interact in this way with the supporting circumferential section 106. In the case of a relative rotation of the first camshaft 42" in relation to the countershaft 26", the supporting circumferential section 106 pivots the locking body carrier 110 radially outward out of the release position which is shown in FIG. 5, to be precise into a coupling position which will be described in the following figures. Pivoting of this type ultimately leads to an end section of the locking body member 116, which end section faces away from the locking body carrier 110 in the circumferential direction, engaging into the coupling toothing system 94, in order to drive the idler gear 88 in the case of a rotation of the countershaft 26" in the drive rotational direction 96', that is to say to set up a rotationally locked connection with respect to the idler gear 88.

In the release position FP which is shown in FIG. 5, in contrast, the idler gear 88 is decoupled from the countershaft 26" in the rotational direction.

Figure 6:
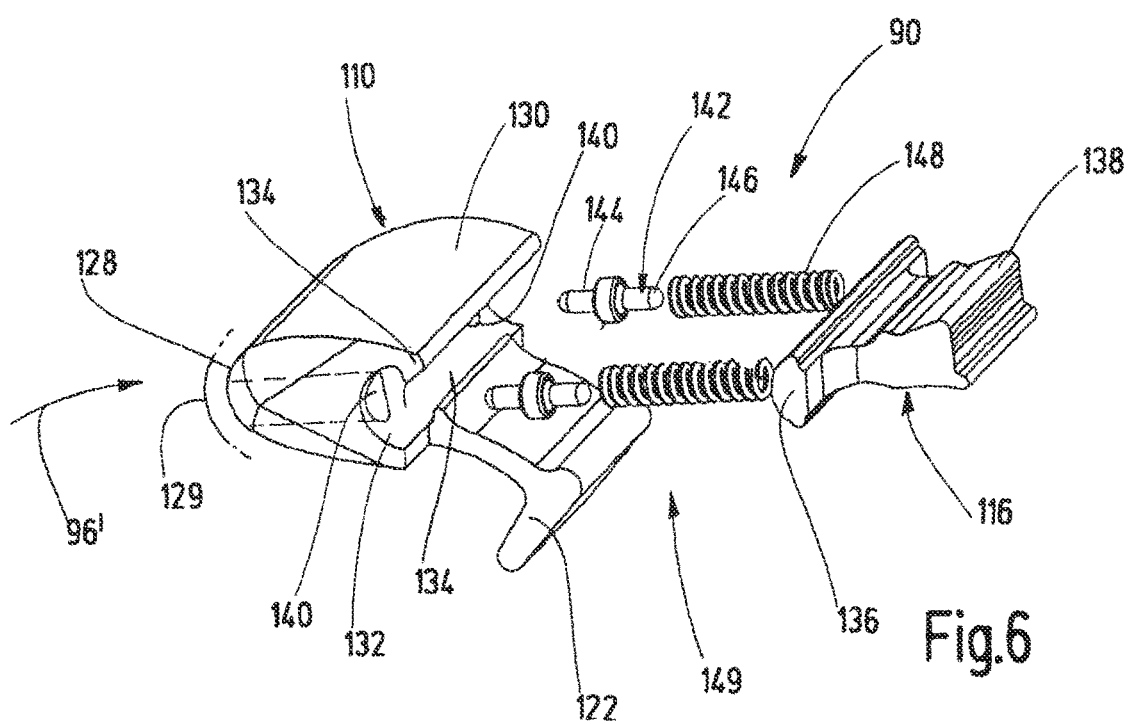
FIG. 6 shows an exploded illustration of the locking body arrangement of FIG. 5.

FIG. 6 shows the locking body arrangement 90 in an exploded illustration.

At its one circumferential end, the locking body carrier 110 has a locking body carrier head 128 which engages into a diagrammatically indicated joint socket 129 which is formed by way of a radial wall of the radial recess 92. FIG. 6 also diagrammatically shows the drive rotational direction 96', and that the locking body carrier 110 is necessarily driven in the same rotational direction in the case of a rotation of the countershaft 26" in the drive rotational direction 96'.

Radially on the outside, the locking body carrier 110 has a locking body carrier deflector face 130, by way of which the locking body carrier 110 can optionally bear against the coupling toothing system 94 and is deflected from the latter, in such a way that the locking body carrier 110 itself cannot engage into the coupling toothing system 94.

At the opposite end in the circumferential direction, the locking body carrier 110 has a locking body carrier socket 132, and two holding lugs 134 which are spaced apart from one another in the radial direction. At one circumferential end, the locking body member 116 has a locking body member head 136 which is formed in such a way that it can be introduced axially into the joint arrangement which is defined by way of the locking body carrier socket 132 and the holding lugs 134. As a result, the locking body member 116 is coupled to the locking body carrier 110 non-releasably in the circumferential direction. The locking body member head 136 can then be supported in the circumferential direction on the locking body carrier socket 132. At the opposite end in the circumferential direction, the locking body member 116 has a driving section 138 which, in the release position FP, lies radially within the outer circumference of the countershaft 26" and, in the coupling position (see below), engages into the coupling toothing system 94, in order for it to be possible for the idler gear 88 to be driven in the drive rotational direction 96.

The articulated connections between the locking body carrier 110 and the countershaft 26" and between the locking body member head 136 and the locking body carrier socket 132 are in each case configured in the manner of curved joints, in such a way that respective rotational axes are not necessarily stationary, but rather can vary in a manner which is dependent on the relative rotation.

Furthermore, the locking body arrangement 90 has two pin holes 140 in the locking body carrier 110 which are spaced apart in the axial direction and extend substantially in the circumferential direction, the pin holes 140 extending in each case from the locking body carrier socket 132 in the direction of the locking body carrier head 128 and being configured in each case as through holes.

Furthermore, the locking body arrangement 90 comprises two pins 142 which have a first pin end 144 with a first diameter and a second pin end 146 with a second external diameter, and a shoulder section with a greater external diameter which lies in between. The pins 142 are introduced into the pin holes 140. The pin holes 140 in each case have shoulders in the region of the locking body carrier head 128, with the result that the pins 142 cannot be pressed in the circumferential direction out of the pin holes 140. In the stop position, however, the first pin ends 144 project with respect to the locking carrier head 128 and bear against the joint socket 129.

Compression springs 148 are arranged in each case between the second pin ends 146 and the locking body member head 136, which compression springs 148 are supported on the shoulder sections of the pins 142 and press in the circumferential direction against the locking body member head 136.

The spring arrangement 149 which is thus shown brings it about that the locking body carrier 110 is prestressed in the direction of the release position FP on account of the contour of the joint socket 129 and the pin ends 144 which act on it. Furthermore, the spring arrangement 149 brings it about that the locking body member 116 is pressed in the circumferential direction away from the locking body carrier socket 132 against the holding lugs 134, as can be seen in FIG. 5, the locking body member 116 being situated in a neutral position.

Figure 7:
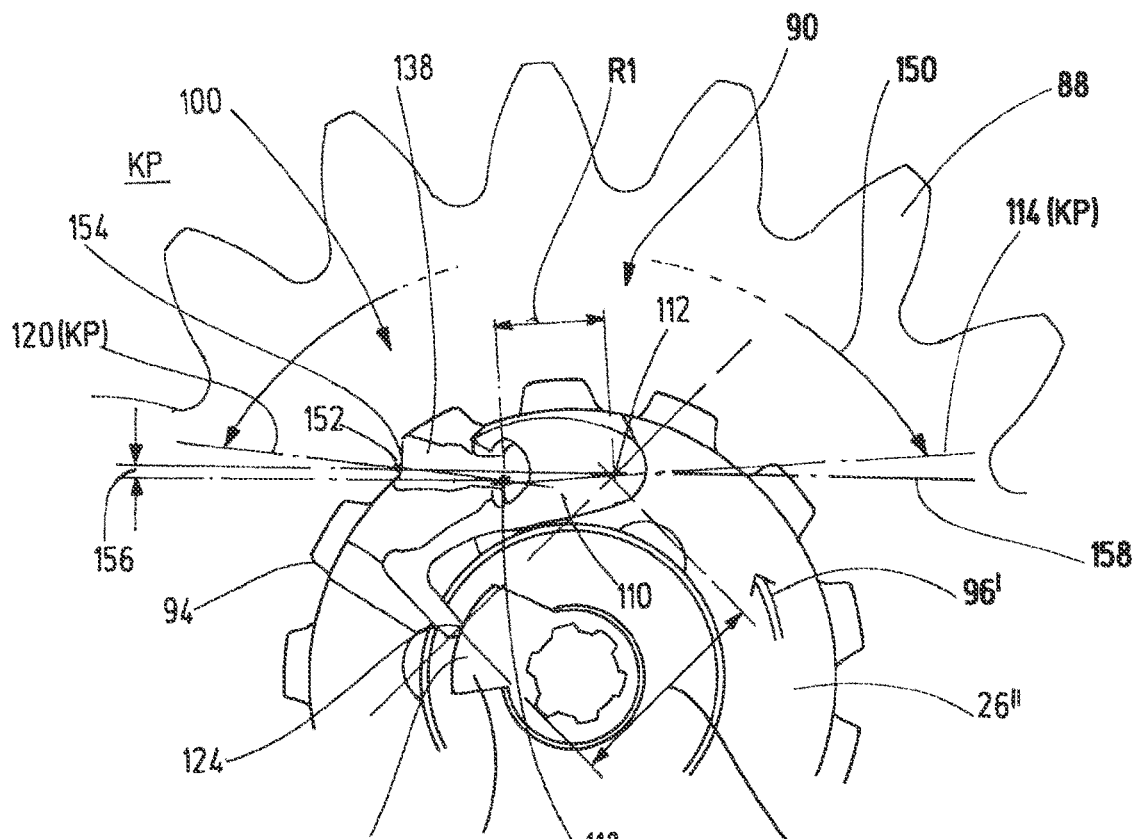
FIG. 7 shows an illustration (comparable to FIG. 5) of the coupling arrangement and the locking body arrangement in a coupling position.

FIG. 7 shows a view of the coupling arrangement 100 of FIGS. 5 and 6, the locking body arrangement 90 having been pivoted into a coupling position KP.

The camshaft has been rotated in such a way that the supporting circumferential section 106 or cam body 104 has moved the cam follower section 122 radially to the outside via the cam follower contact 124, in such a way that the locking body carrier 110 overall has been pivoted to the outside around the locking body carrier pivot axis 112. Here, the locking body carrier deflector face 130 lies in the region of the outer circumference of the countershaft 26".

Furthermore, the driving section 138 of the locking body member 116 bears against a tooth flank 154 of the coupling toothing system 94 and therefore engages into the latter. An effective engagement point 152 between the driving section 138 and the tooth flank 154 forms, together with the locking body carrier pivot axis 112, a straight connecting line which corresponds to a force action line 158, along which drive power of the countershaft 26" is transmitted in the drive rotational direction 96' via the locking body carrier 110 and the locking body member 116 to the coupling toothing system 94 and therefore to the idler gear 88.

Here, a radially outer section of the driving section 138 preferably bears against a tooth base of the coupling toothing system 94.

Here, the locking body member 116 has likewise been pivoted radially to the outside with respect to the neutral position which is shown in FIG. 5 into a coupling position, in such a way that a locking body member axis 120 extends in the coupling position 120 (KP) from the engagement point 152 as far as a locking body member pivot axis 118 which lies offset radially with respect to the force action line 158, and in the present case lies radially within the force action line 158. The spacing of the locking body member pivot axis 118 from the force action line 158 is shown at 156 in FIG. 7. In this state, in other words, a locking body carrier axis 114 (KP) between the locking body carrier pivot axis 112 and the locking body member pivot axis 118 and a locking body member axis 120 (KP) between the locking body member pivot axis 118 and the engagement point 152 assume a force transmission angle 150 which is smaller than 180° and is preferably greater than or equal to 150°.

The force which is introduced along the drive rotational direction 96' from the countershaft 26" via the joint socket 129 into the locking body carrier 110 is transmitted via the locking body carrier socket 132 and the locking body member head 136 which bears against it in the coupling position KP to the locking body member 116 and therefore to the coupling toothing system 94.

Here, the two members of the locking body arrangement, namely the locking body carrier 110 and the locking body member 116, are situated in a relative position with respect to one another, in the case of which relative position a pivot axis 118 between them is offset with respect to the force action line 158. Accordingly, in order to transmit the power in the circumferential direction (drive rotational direction 96') to the coupling toothing system 94, it is necessary to support the locking body arrangement 90 via the cam follower contact 124, the cam follower section 122 being supported on the supporting circumferential section 106.

By virtue of the fact that the locking body member pivot axis 118 lies very close to the force action line 158, the radial force which is required to support the locking body carrier 110 is relatively low. Said radial force is additionally reduced further by virtue of the fact that the spacing between the pivot axes 112 and 118 is smaller than the spacing between the locking body carrier pivot axis 112 and the cam follower contact 124, as shown in FIG. 7 at R1 and R2.

Figure 8:
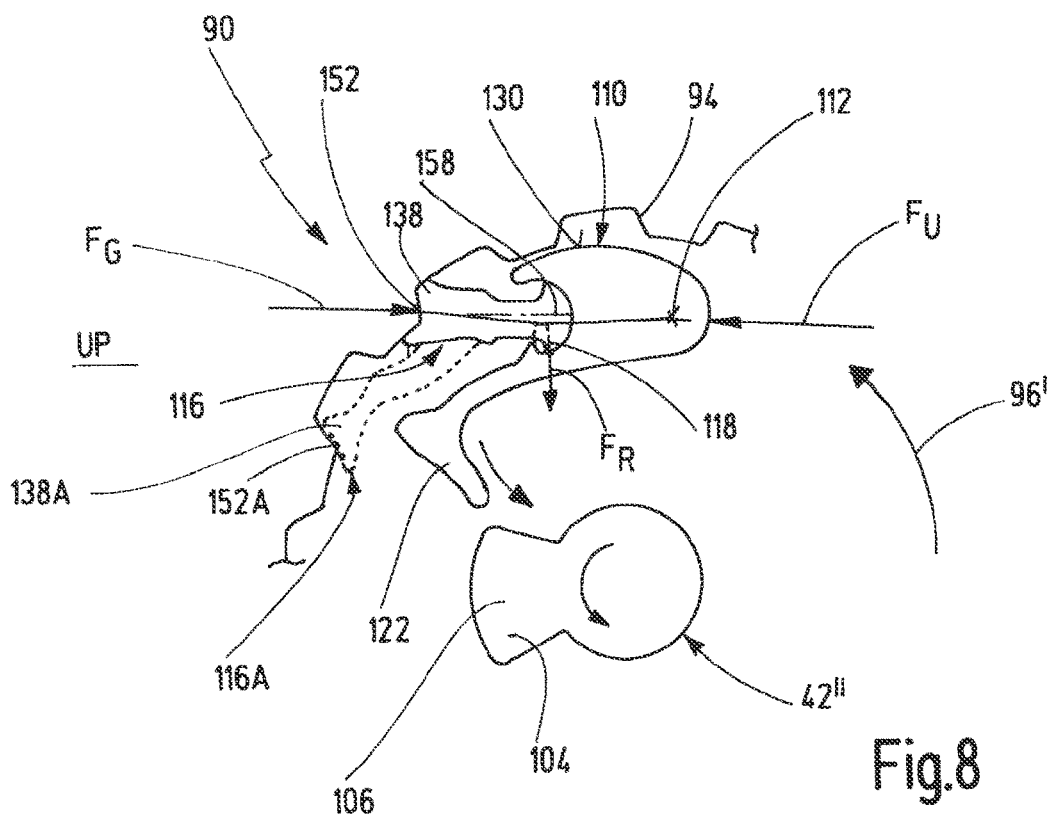
FIG. 8 shows a diagrammatic illustration of the locking body arrangement in order to illustrate the forces which occur, the locking body arrangement being shown in a transition position, in the case of which the locking body arrangement passes out of the coupling position which is shown in FIG. 7 into a release position on account of a rotation of a camshaft.

It can be seen in FIG. 8 that, in the case of the transmission of the circumferential force $F_U$ in the drive rotational direction 96', said force acts in the force action line 158, a counterforce $F_G$ which is present at the engagement point 152 (for example, due to a drive counterforce which can be formed by way of a driving resistance or the like) lying in the same force action line 158, from which the locking body member pivot axis 118 is spaced apart radially. The forces $F_U$, $F_G$ which act in opposite directions along the force action line 158 generate a resulting force $F_R$ in the locking body member pivot axis 118 as a consequence, which force $F_R$ is directed radially to the inside. In the coupling position KP, said force $F_R$ is supported in the cam follower contact 124 by the cam follower section 122 bearing against the supporting circumferential section 106.

As soon as the camshaft 42" rotates further, as indicated in FIG. 8, the cam follower section 122 loses its support by way of the supporting circumferential section 106, with the result that the locking body member pivot axis 118 is pressed radially freely toward the inside and in the process drives the locking body carrier 110, in such a way that the latter is pivoted in the direction of the release position, as indicated in FIG. 8 by way of an arrow. Said position between the coupling position KP and the release position FP is also called a transition position UP.

FIG. 8 shows that the locking body member pivot axis 118 migrates radially to the inside, as a result of which the force transmission angle 150 (see FIG. 7) will decrease.

According to FIG. 8, the locking body member 116 has a single driving section 138. In one alternative refinement, a locking body member 116A has two (or more) driving sections 138, 138A, as indicated by way of a dashed line. In this case, the locking body member 116A acts at two engagement points 152, 152A on the coupling toothing system 94, in particular on tooth flanks of different teeth of the coupling toothing system 94. In comparison with the illustration of FIG. 8, the pitch of the coupling toothing system 94 for this case tends to be selected to be smaller, with the result that the engagement points 152, 152A lie closer to one another in the circumferential direction.

In addition, as shown in FIG. 8, the driving section 138 of the locking body member 116 has a contour in the region of the engagement point 152, which contour is such that the locking body arrangement is assisted in releasing itself from the coupling toothing system 94 by way of the locking body member 116 in the case of the transition from the coupling position KP to the release position FP. Secondly, said contour of the driving section 138 is configured in such a way that, in the coupling position KP, the locking body member 116 is pressed into the coupling toothing system 94.

This will be described in the following text on the basis of FIGS. 9 and 10.

Figure 9:
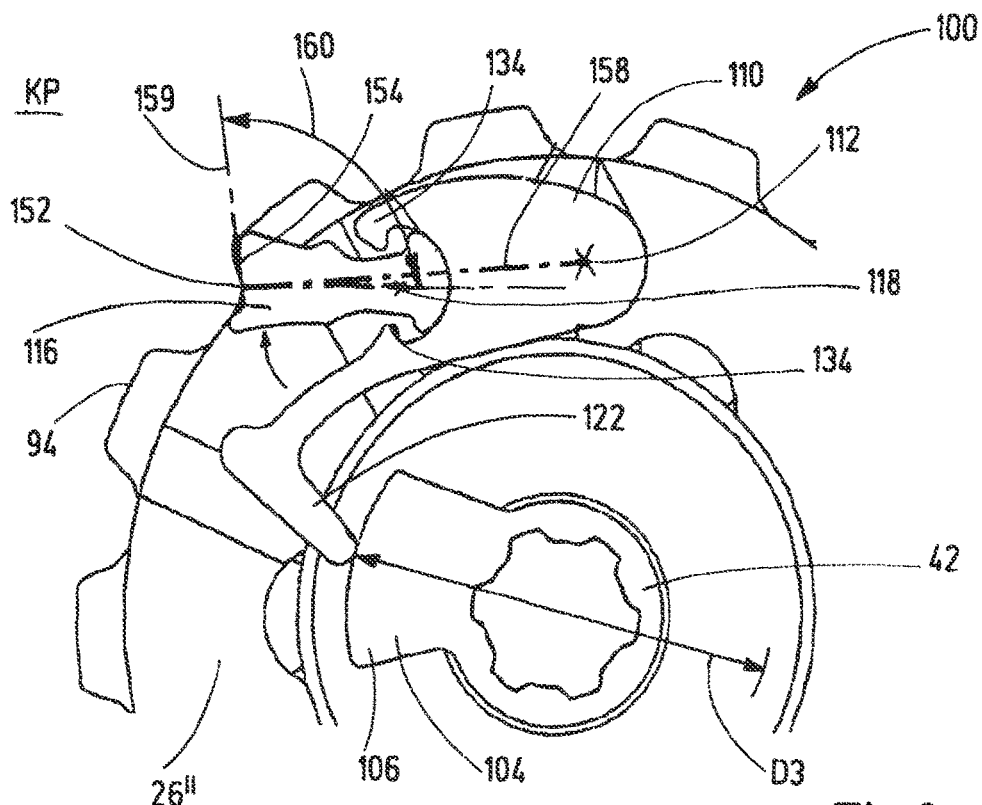
FIG. 9 shows an illustration (comparable to FIG. 7) of the coupling arrangement in the coupling position, in an enlarged illustration.

FIG. 9 shows the coupling arrangement 100 in the coupling position KP. In the coupling position KP, the locking body carrier 110 is fixed. The locking body member 116 can be pivoted about the locking body member pivot axis 118. Furthermore, it can be seen that in the coupling position, the driving section 138 acts on the tooth flank 154 of the coupling toothing system 94 at an engagement point 152 which actually defines an engagement line which runs perpendicularly with respect to the plane of the drawing. The driver section 138 has a contour or face which comprises the engagement line and which defines a driver section plane 159. An angle 160 is formed between the driver section plane 159 and an action line which is defined by way of the locking body member pivot axis 118 and the engagement point 152. The angle 160 forms a negative profile and, in particular, is greater than 90°. This achieves a situation where the locking body member 116 and therefore the entire locking body arrangement 90 are pressed radially to the outside into the coupling toothing system 94 in the coupling position and when a force is transmitted along the force action line 158. A lug which is not denoted in greater detail is configured on a radially inner section of the locking body member 116, which lug, in the coupling position KP, bears against an associated tooth tip and thus ensures a defined position of the locking body member 116 and a defined force transmission angle 150 in the coupling position KP.

Figure 10:
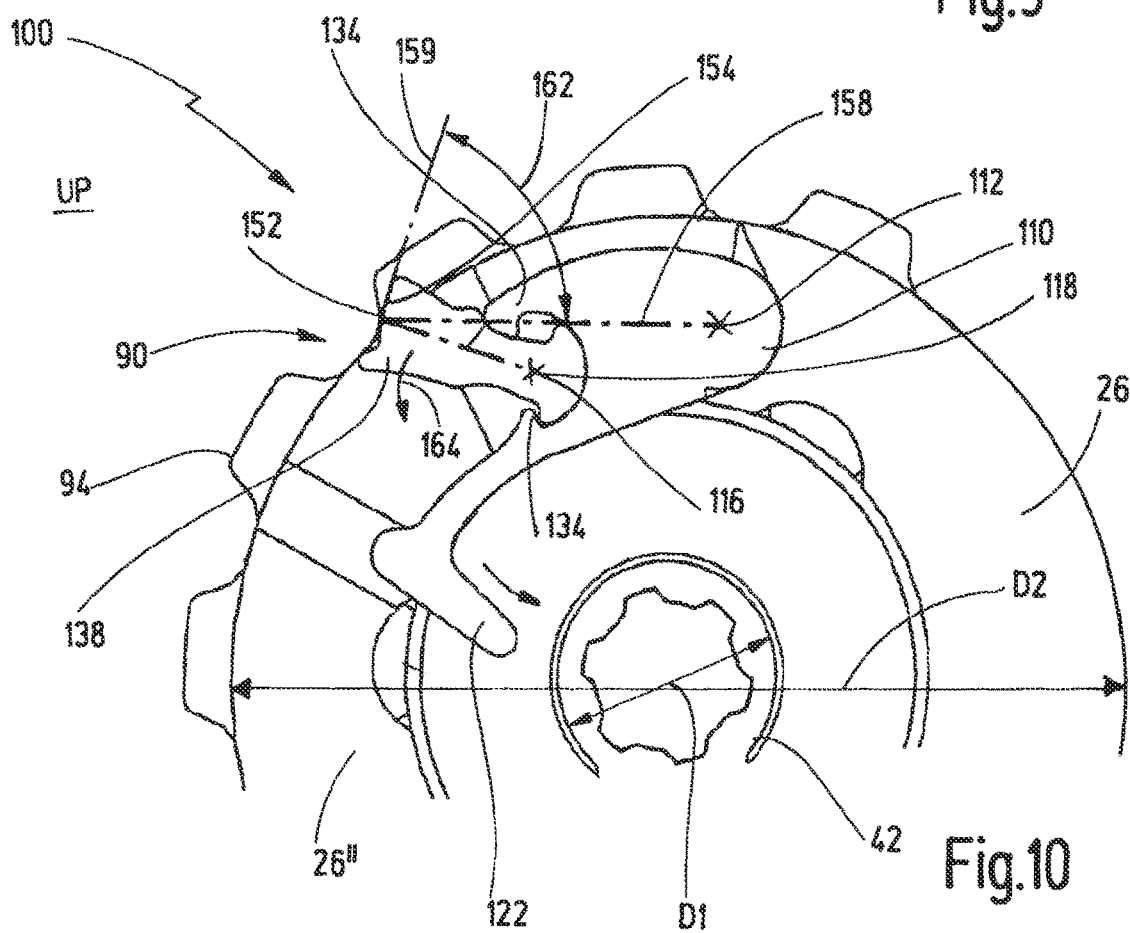
FIG. 10 shows an illustration (comparable to FIG. 9) of the locking body arrangement in the transition position, to be precise shortly after a transition of the locking body arrangement out of the coupling position in the direction of the release position.

FIG. 10 shows a situation which is similar to FIG. 8 and in the case of which the coupling arrangement 100 is situated at a transition from the coupling position KP to the release position FP. The locking body carrier 110 is no longer fixed and pivots radially to the inside on account of the absence of support by way of the supporting circumferential section 106. As a result, the force transmission angle 150 which is not shown in greater detail in FIG. 10 is decreased. The locking body member 116 pivots against the radially outer holding lug 134 which forms a pivoting angle limiting means, with the result that the locking body arrangement 90 overall pivots inward, to be precise around the locking body carrier pivot axis 112. As a result, the driving section 138 acts on the tooth flank 154 of the coupling toothing system 94 at a different angle, in particular radially further to the inside. An angle 162 between the force action line 158 (defined by way of the locking body carrier pivot axis 112 and the engagement point 152) and the driver section plane 159 then forms a positive profile and, in particular, is less than 90°. On account of the continued transmission of force along the force action line 158, the locking body arrangement 90 overall is pressed out of the coupling toothing system 94, as indicated by way of an arrow 164.

The shape of the driving section 138 which comes into contact with the tooth flank 154 is selected in such a way that the above-described effects occur.

In addition, FIGS. 9 and 10 show the following diameters, namely a diameter D1 which represents the external diameter of the camshaft 42, a diameter D2 which represents the external diameter of the countershaft 26 (and preferably the internal diameter of the idler gear 88), and (see FIG. 9) a diameter D3 which represents the effective diameter of the supporting circumferential section 106 or the cam 104.

The ratio of D1 to D2 is preferably smaller than 0.5, in particular smaller than 0.35. The ratio of D3 to D2 is preferably smaller than 0.6, preferably smaller than or equal to 0.5.

As a result, the circumferential forces which occur in the case of the transmission of force from the countershaft to the idler gear can be supported on a relatively small radius, which can decrease the frictional forces which are required to rotate the camshaft 42 during a transmission of force of this type ("under load").

Figure 11:
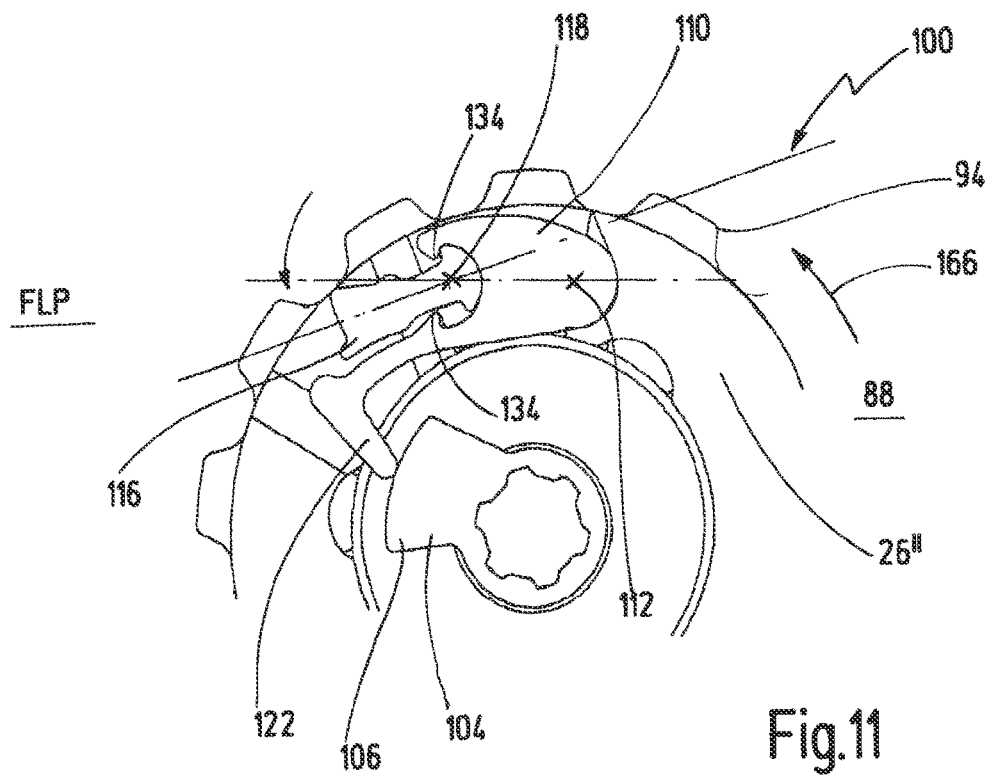
FIG. 11 shows an illustration (comparable to FIG. 9), in the case of which the locking body arrangement is situated in a freewheel position.

FIG. 11 shows the coupling arrangement 100 in a freewheel position FLP.

The locking body carrier 110 is situated in the coupling position. The cam follower section 122 is supported by way of the cam 104 or the supporting circumferential section 106. In the case of a transmission of force from the countershaft 26" to the idler gear 88, the locking body member 116 is likewise situated in the coupling position, as shown by way of example in FIG. 9. If, starting from the situation of FIG. 9, the idler gear 88 should then suddenly rotate more rapidly than the countershaft 26" for any desired reason, a freewheel situation occurs, in the case of which the toothing system 94 of the idler gear 88 pivots the locking body member 116 radially to the inside in relation to the locking body carrier 110, as indicated in FIG. 11 by way of an arrow. Here, on account of the pivoting mounting on the locking body carrier 110, the locking body member 116 can pivot in such a way that the locking body member 116 is arranged completely within the outer circumference of the countershaft 26". As a consequence, the idler gear 88 can rotate more rapidly than the countershaft 26" in a largely unimpeded manner, with the result that there is the possibility of freewheeling. The coupling arrangement 100 after all comprises the spring arrangement 149, as shown in FIG. 6. Accordingly, starting from the radially inwardly pivoted-in position which is shown in FIG. 11, the locking body member 116 is generally pressed radially to the outside by way of the spring arrangement 149, to be precise into the neutral position in relation to the locking body carrier 110, as shown in FIG. 5, for example. In the freewheel position FLP, the locking body member 116 therefore constantly attempts to pivot radially to the outside again, to be precise into the coupling toothing system 94. If the outpacing situation of the idler gear 88 with respect to the countershaft 26" is therefore ended, as indicated at 166, and the countershaft 26" is again rotating more rapidly than the idler gear 88, the locking body member 116 pivots again radially to the outside into the coupling toothing system, in order to set up the coupling position KP again, as shown in FIG. 9, for example.

Figure 12:
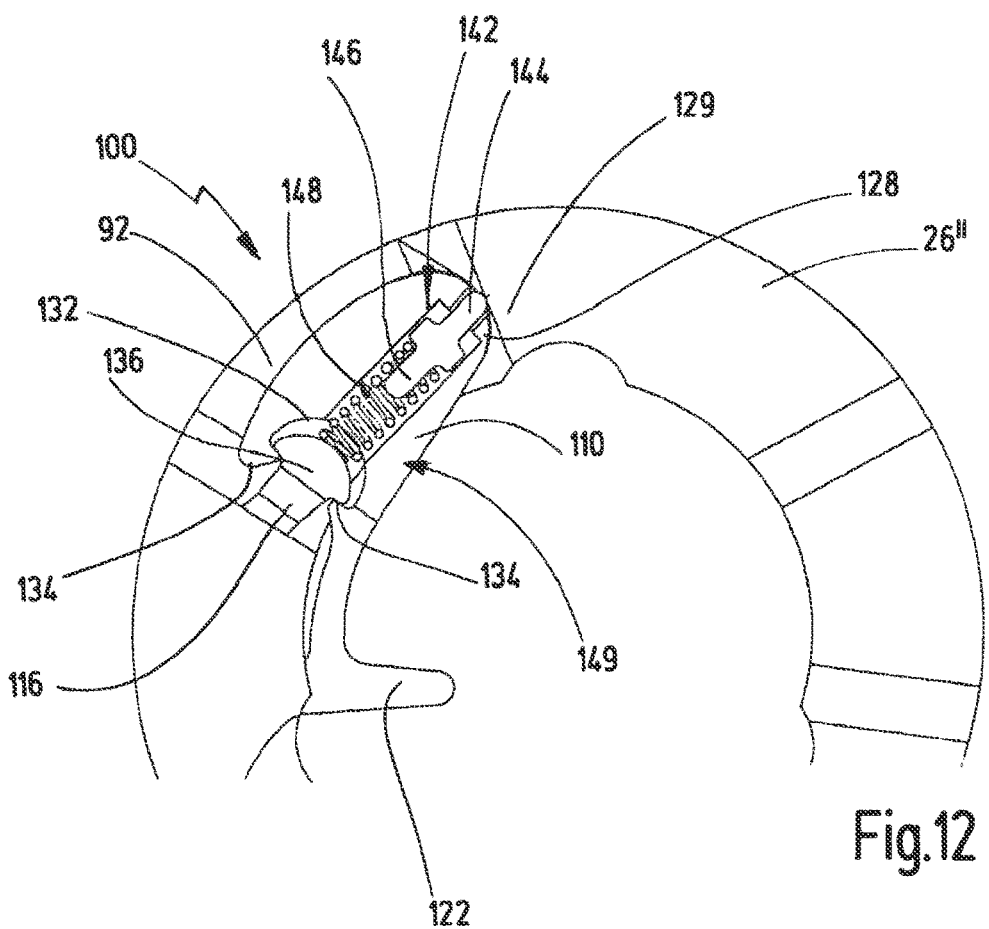
FIG. 12 shows a diagrammatic sectional view in order to illustrate the action of force of the spring arrangement of FIG. 6, FIGS. 13-16 show the coupling arrangements of a source gear stage and a target gear stage in the case of a downshift operation.

FIG. 12 shows a sectional view of the coupling arrangement 100 in order to clarify the method of operation of the spring arrangement 149.

In the illustration of FIG. 12, the pin 142 is moved in the circumferential direction with respect to a stop position, since the first pin end 144 bears against the joint socket 129, to be precise in the region, in which the locking body carrier head 128 also bears against the joint socket 129. The compression spring 148 is centered on the pin 142 by way of the second pin end 146, and presses in the circumferential direction against the locking body member head 136, in such a way that the latter is pressed in the circumferential direction away from the locking body carrier socket 132, to be precise against the holding lugs 134. The locking body member head 136 is formed in relation to the holding lugs 134 in such a way that the locking body member 116 is prestressed by way of the spring force of the compression spring 148 into the neutral position, with respect to which the locking body member 116 can be pivoted both radially to the outside and radially to the inside.

FIGS. 13 to 16 show a coupling arrangement 100-Q for a source gear stage (for example, gear stage 5) and a coupling arrangement 100-Z for a target gear stage (for example, gear stage 4) for a downshift operation, to be precise in various phases of the downshift operation which can take place under load on account of the coupling arrangements 100-Q and 100-Z.

The gear stages 5 and 4 as source and target gear stage are selected purely by way of example. They might also be the gear stages 3 and 2 or the like.

FIG. 13 shows a state, in the case of which the coupling arrangement 100-Q is situated in the coupling position KP, with the result that drive power 96 can be transmitted via the coupling arrangement 100-Q (that is to say, for example, from a countershaft to an idler gear, or from an idler gear to a countershaft). In the same state of FIG. 13, the coupling arrangement 100-Z for the target gear stage is in a release position FP, that is to say is not yet engaged.

In order to carry out a downshift, the coupling arrangement 100-Z for the target gear stage is actuated (for example, by way of actuation of a traction disk 64 and/or 80 according to FIG. 3). Here, the camshaft is rotated, to be precise by an angle which is smaller than the angle, over which the respective supporting circumferential section 106 extends. This means that the coupling arrangement 100-Q is still in the coupling position KP, that is to say is supported by the associated supporting circumferential section. In FIG. 14, the two coupling arrangements 100-Q and 100-Z are therefore situated in the coupling position KP. Here, on account of the higher rotational speed of the source gear stage, the source coupling arrangement 100-Q is still in engagement and transmits drive power 96, whereas the coupling arrangement 100-Z is in the coupling position KP, but does not transmit any load. This can be seen in the fact that a locking body member head of the locking body member 116 is spaced apart in the circumferential direction from the associated joint socket of the locking body carrier 110.

In the case of further rotation of the camshaft in relation to the countershaft in the same rotational direction, the cam follower section 122 of the source coupling arrangement 100-Q passes out of engagement with the associated supporting circumferential section of the cam, in such a way that the source coupling arrangement 100-Q passes into the transition position UP. As a result, the source coupling arrangement 100-Q cannot transmit drive power anymore. The target coupling arrangement 100-Z passes into engagement and, in the coupling position KP, transmits drive power 96, as shown in FIG. 15.

As a result of the specific configuration of the driving section of the coupling arrangement 100-Q, as described above, said coupling arrangement 100-Q passes further out of engagement with the associated coupling toothing system, and passes into the release position FP which is shown in FIG. 16. The target coupling arrangement 100-Z remains in the coupling position and continues to transmit drive power 96.

As a consequence, the entire gear change operation can proceed in such a way that drive power, as depicted by way of the arrow 96, is transmitted by the source coupling arrangement 100-Q up to the time at which the latter is relieved, and the target coupling arrangement 100-Z which is already situated in the coupling position KP assumes the transmission of the drive power, and then in the lower gear stage (for example, GS 4).

FIG. 17 diagrammatically shows the camshaft 42 and the camshaft 44 which are arranged in the countershaft 26. The camshaft arrangement which is formed by way of the camshafts 42, 44 comprises a first latching arrangement 180 which is assigned to the first camshaft 42, and a second latching arrangement 182 which is assigned to the second camshaft 44.

The camshafts 42, 44 are coupled to one another via a driver arrangement 184, in such a way as will be described in the following text with reference to FIGS. 19 to 21.

FIG. 18 shows the camshafts 42, 44 in an exploded illustration.

It can be seen that the camshafts 42, 44 in each case have an external toothing system 103, 103' which is configured in each case as a radial toothing system with axially oriented teeth and tooth grooves. In order to form the camshafts, camshaft bearing disks 105 and cams or cam bodies 104 are pushed in each case in an alternating manner onto the respective cam carrier shafts 102, 102'. The camshafts 42, 44 are supported in each case on the inner circumference of the shaft 26 via the camshaft bearing disks 105 in the radial direction.

The pitch or the number of teeth of the external toothing systems 103, 103' can be identical, and is preferably a function of the number of gear stages.

The camshafts 42, 44 are latched via the respective latching arrangements 180, 182 in a latching manner in respective positions, in the case of which a gear stage is engaged, that is to say a cam follower section 122 is situated on a supporting circumferential section 106.

As is shown in FIG. 18, the latching arrangements 180, 182 in each case have a positioning bearing 186, 186' which is connected in a rotationally locked manner to the shaft 26. In each case one ball 188, 188' is mounted on the positioning bearing 186, 186' in a radially displaceable manner. The balls 188, 188' are held in each case toward the outside in the radial direction by way of spring rings 190, 190' which are of open configuration in the circumferential direction.

In the case of a relative rotation of a camshaft 42, 44 with respect to the shaft 26, the respective ball 188, 188' is pressed radially to the outside out of a tooth groove of the external toothing system 103, 103', to be precise counter to the prestress of the respective spring ring. As soon as the camshaft has rotated to such an extent that the ball 188, 188' is situated again above a tooth groove, the respective spring ring 190, 190' presses the ball again into the tooth groove, with the result that a latching position is once again set up.

The camshafts 42, 44 are coupled to one another via the driver arrangement 184.

The driver arrangement 184 has a driver disk 192 which is plugged in a rotationally locked manner onto the external toothing system 103 of the camshaft 42. The driver disk 192 is connected rotatably to the camshaft 44, and has a radial groove, in which a roller 194 is mounted (the rotational axis of the roller 194 is parallel to the axis of the camshaft 42).

That section on which the radial groove is configured is engaged over by a control ring 196, on which the roller 194 acts from the inside. Just like the balls 188, 188', the roller 194 is adapted to the size of the external toothing system 103, in such a way that the roller 194 can engage into a tooth base of the external toothing system 103.

The control ring 196 has a circumferential section 198 with a smaller internal diameter, by means of which an angle-selective driving function is set up between the camshafts 42, 44. The circumferential section 198 extends over an angle which is dependent on the number of gear stages which are assigned to the camshaft 42. In the present case, the angle of the circumferential section 198 is precisely 60° (360° divided by six gear stages=60°).

The function of the driver arrangement 184 will be described in detail on the basis of FIGS. 19 to 21.

FIG. 19 shows the driver arrangement 184 in a first position. Here, the roller 194 lies in the groove of the driver disk 192 and, in particular, bears against the inner circumference of the control ring 196, to be precise in a region outside the circumferential section 198. As a consequence, the camshaft 42 can be rotated freely, in order in this way to change the gear stages which are assigned to the camshaft 42 (in the present case, six gear stages).

If the camshaft with the driver disk 192 which is fastened to it is rotated until the roller 194 passes into engagement with the circumferential section 198 (FIG. 20), the roller 194 is pressed radially to the inside, to be precise into the external toothing system 103 of the camshaft 42.

As a consequence, a further rotation of the camshaft 42 leads to the driving of the driver disk 192 which is then connected in a rotationally locked manner to the second camshaft 44. As a consequence, the second camshaft 44 is driven in the rotational direction via the circumferential section 198 when the first camshaft 42 is rotated. This leads to a gear stage which is assigned to the second camshaft 44 also being selected.

Said function is used to perform a gear change, in the case of which the two gear mechanism groups are to be shifted.

As a consequence, in the case of a gear mechanism which has two gear mechanism groups which are assigned six and three gear stages, respectively, the gear stages 1 to 6 are selected solely by way of rotation of the first camshaft 42. Here, the second camshaft 44 remains at a standstill and is held in the rotational position by the latching device 182.

In the case of the selecting of the gear stage 7, the first camshaft 42 again passes into a position which corresponds to the first forward gear stage of the first gear mechanism group, and the second camshaft 44 which is driven in the process, to be precise by means of the circumferential section 198, is shifted into the next gear stage of the second gear mechanism group, with the result that the gear stage 7 is then engaged. Subsequently, the gear stages 8 to 12 are selected again, without driving the second camshaft 44. In order to engage the forward gear stage 13, the second camshaft 44 is then once again driven, in order to select a gear stage which is assigned to the second camshaft 44 and therefore the second gear mechanism group.

FIG. 22 shows a further embodiment of a coupling arrangement 100''' which corresponds with regard to construction and method of operation to the above-described coupling arrangement 100, identical elements being identified by way of identical designations, and which coupling arrangement 100''' serves to couple a first rotary member in the form of a sun gear 88''' as required to a second member in the form of a hub 26''' which is fixed on the housing.

The sun gear 88''' is part of a planetary gear set 170 which has an internal gear 172 and a planetary carrier 174. A plurality of planets 176 are mounted rotatably on the planetary carrier 174, which planets 176 engage into an internal toothing system of the internal gear 172 and into an external toothing system of the sun gear 88''. Furthermore, the sun gear 88''' has a coupling toothing system 94''' on its inner circumference.

In general, the sun gear 88''' can rotate freely in relation to the hub 26''. As a result of a rotation of a camshaft (not shown, corresponding to the camshaft 42 in the case of the coupling arrangement 100 of FIGS. 4 to 12), the locking body arrangement 90''' which is mounted on the hub 26''' can be pivoted radially to the outside, with the result that it engages into the coupling toothing system 94''' of the sun gear 88''', in order to hold the sun gear 88''' fixedly on the housing in a drive direction, and to realize a freewheel function in the opposite rotational direction.

Here, the construction of the coupling arrangement 100''' can be identical to the coupling arrangement 100 of FIGS. 4 to 12.

Figure 23:
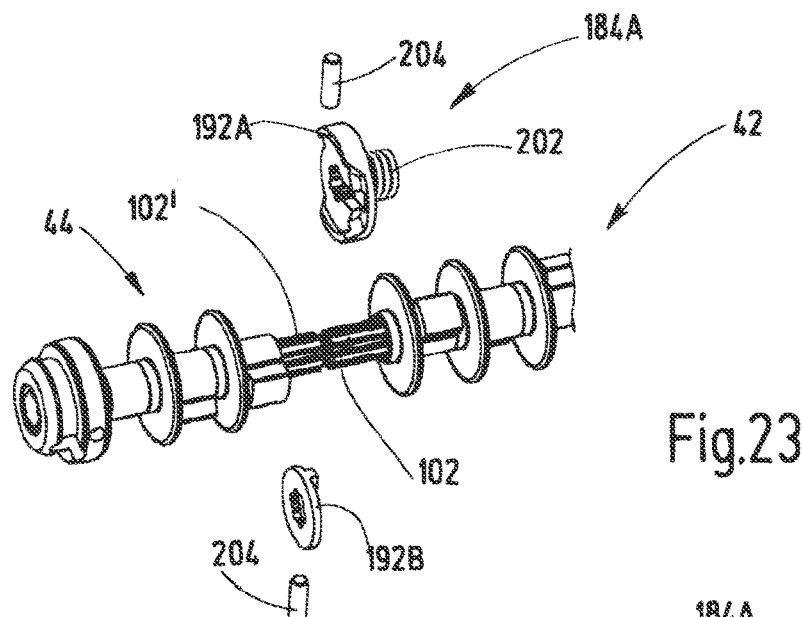
FIG. 23 shows an illustration (comparable to FIG. 18) of a camshaft with an alternative embodiment of a driver arrangement.
Figure 24:
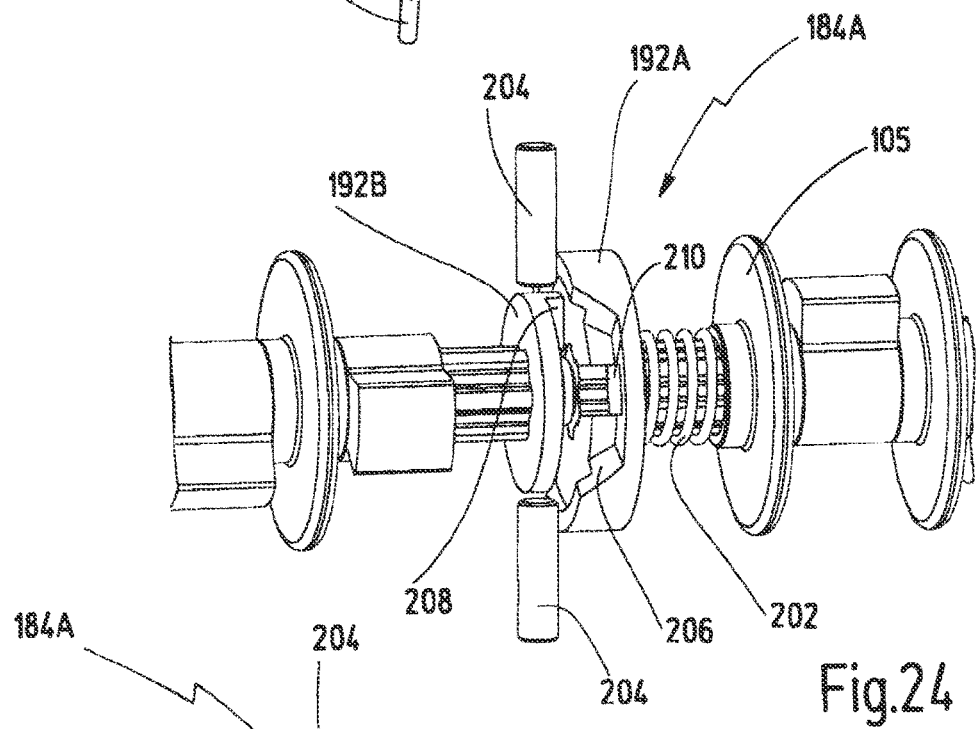
FIG. 24 shows the driver arrangement of FIG. 23 in an open position.
Figure 25:
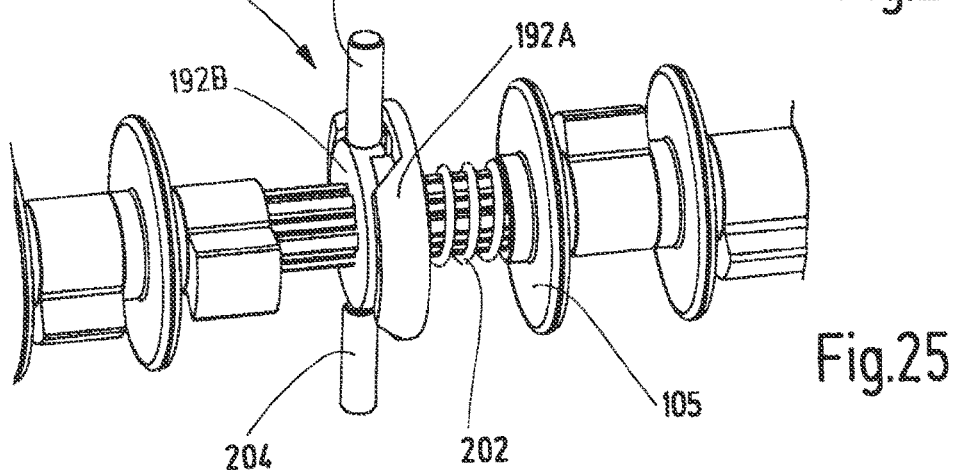
FIG. 25 shows the driver arrangement of FIG. 23 in a closed position.

FIGS. 23 to 25 show an alternative embodiment of a driver arrangement 184A, the function of which is identical to that of the driver arrangement 184 which has been described above.

The driver arrangement 184A of FIGS. 23 to 25 comprises a first driver disk 192A and a second driver disk 192B, a compression spring 202 and two radially oriented driver pins 204.

The first driver disk 192A is mounted on the first cam carrier shaft 102 fixedly so as to rotate with it, but in an axially displaceable manner. The second driver disk 192B is fixed in a rotationally and axially locked manner on the second cam carrier shaft 102' of the second camshaft 44.

The first driver disk 192A is pressed against the second driver disk 192B by means of the compression spring 202 which is supported axially on a camshaft disk 105.

The driver pins 204 are pressed fixedly into radial bores (not shown in greater detail) of the shaft 26 and extend from the inner circumference of the latter radially to the inside.

The first driver disk 192A has an opening angle 206 and a groove 210 which extends axially. The second driver disk 192B has an axially extending pin 208.

FIG. 24 shows a position of the driver arrangement 184A, in the case of which position the camshafts 42, 44 are decoupled from one another, with the result that a rotation of the first camshaft 42 brings about exclusively a gear change within the first gear mechanism group, but the second camshaft 44 is not corotated. In said position, the first driver disk 192A is supported axially on the driver pins 204, that is to say is pressed axially against the pins 204 by the compression spring 202. Here, the driver disks 192A, 192B are decoupled from one another.

As soon as the first camshaft is rotated until the driver pins 204 pass into the region of the opening angle 206, the compression spring 202 can press the first driver disk 192A axially against the second driver disk 192B, the pin 208 being pressed into a groove 210 of the first driver disk 192A, with the result that a rotational coupling is realized between the driver disks 192A, 192B. This is shown in FIG. 25.

A further rotation of the first camshaft 42 therefore leads at the same time to a rotation of the second camshaft 44, with the result that the two gear mechanism groups can be shifted. Subsequently, the arrangement comprising the driver pins 204 passes out of the region of the opening angle 206 again. As a consequence, the first driver disk 192A is pressed axially away from the second driver disk 192B counter to the force of the spring 202 on account of a transition bevel on the driver pins 204, with the result that the driver disks 192A, 192B pass out of engagement again.

As a consequence, for the next rotations over in each case, for example, angles of 60°, only gear stages of the first gear mechanism group can be shifted, until the opening angle 206 is reached again, in order then to once again also shift a gear stage in the second gear mechanism group. This takes place, as in the case of the above example of FIGS. 17 to 21, for example, in the case of shifting of the gear stages 6 to 7 and from 12 to 13.

What is claimed is:

1. A gear mechanism unit having a gear change coupling for coupling members, the gear change coupling comprising:
   a first member which has a coupling toothing system,
   a second member, on which at least one locking body arrangement is mounted pivotably, it being possible for the locking body arrangement to be pivoted into a coupling position, in the case of which a driving section of the locking body arrangement engages into the coupling toothing system, in order to couple the first member to the second member in a positively locking manner with respect to a relative movement in a first direction, and it being possible for the locking body arrangement to be pivoted into a release position, in the case of which the driving section of the locking body arrangement does not engage into the coupling toothing system,
   wherein the locking body arrangement has a locking body carrier which is mounted pivotably on the second member, and has a locking body member which is mounted pivotably on the locking body carrier and on which the driving section is configured,
   wherein, in the coupling position, the locking body carrier is supported by means of a supporting member with respect to pivoting in the direction of the release position,
   wherein at least one of the first member and the second member is a rotary member which can be rotated about a rotational axis, the gear change coupling serving to connect the first and the second member fixedly to one another so as to rotate together, and the first direction being a rotational direction.

2. The gear mechanism unit as claimed in claim 1, wherein the supporting member can be moved between a supporting position, in which it supports the locking body carrier, and a decoupling position, in which the supporting member permits pivoting of the locking body carrier into the release position.

3. The gear mechanism unit as claimed in claim 1, wherein the locking body carrier and the locking body member are connected to one another in series so that a force from the second member is transmitted to the locking body carrier and from the latter to the locking body member which then engages in turn with its driving section into the coupling toothing system, in order to realize the coupling position in the drive direction.

4. The gear mechanism unit as claimed in claim 1, wherein the locking body carrier and the locking body member are connected to one another in series so that, during a gear change from a source gear stage to a target gear stage, the source gear stage can be disengaged reliably.

5. The coupling arrangement as claimed in claim 1, wherein, in the coupling position, the locking body carrier is oriented along a locking body carrier axis, the locking body member being oriented in the coupling position along a locking body member axis, the locking body carrier axis and the locking body member axis in the coupling position being oriented with respect to one another at a force transmission angle of greater than or equal to 150° and less than 180°.

6. The gear mechanism unit as claimed in claim 1, wherein the locking body member can be pivoted out of a locking body member coupling position into a freewheel position.

7. The gear mechanism unit as claimed in claim 1, wherein, at a first end, the locking body carrier has a locking body carrier head which is assigned to a joint socket of the second member, in order to form a first pivoting bearing between the second member and the locking body carrier.

8. The gear mechanism unit as claimed in claim 1, wherein, at a second end, the locking body carrier has a locking body carrier socket which is assigned a locking body member head of the locking body member, in order to form a second pivoting bearing between the locking body carrier and the locking body member.

9. The gear mechanism unit as claimed in claim 1, wherein the driving section is configured in such a way that the locking body arrangement is pressed into the coupling toothing system in the case of the transmission of a drive force from the second member to the first member and when the locking body arrangement is situated in the coupling position.

10. The gear mechanism unit as claimed in claim 1, wherein the driving section is configured in such a way that the locking body arrangement is pressed out of the coupling toothing system in the case of the transmission of a drive force from the second member to the first member and when the locking body arrangement is pivoted out of the coupling position in the direction of the release position.

11. The gear mechanism unit as claimed in claim 1, wherein the locking body carrier is held in a locking body carrier release position by means of an elastic spring device.

12. The gear mechanism unit as claimed in claim 11, wherein the elastic spring device has a compression spring arrangement which acts between a pin, which bears against the second member, and the locking body member.

13. The gear mechanism unit as claimed in claim 1, comprising a camshaft which has a decoupling circumferential section and a supporting circumferential section, the locking body arrangement having a cam follower section which, in the release position, does not act on the supporting circumferential section and which, in the coupling position, acts on the supporting circumferential section.

14. A gear mechanism unit having a gear change coupling for coupling members, the gear change coupling comprising:
  a first member which has a coupling toothing system,
  a second member, on which at least one locking body arrangement is mounted pivotably, it being possible for the locking body arrangement to be pivoted into a coupling position, in the case of which a driving section of the locking body arrangement engages into the coupling toothing system, in order to couple the first member to the second member in a positively locking manner with respect to a relative movement in a first direction, and it being possible for the locking body arrangement to be pivoted into a release position, in the case of which the driving section of the locking body arrangement does not engage into the coupling toothing system,
  wherein the locking body arrangement has a locking body carrier which is mounted pivotably on the second member, and has a locking body member which is mounted pivotably on the locking body carrier and on which the driving section is configured,
  wherein, in the coupling position, the locking body carrier is oriented along a locking body carrier axis, the locking body member being oriented in the coupling position along a locking body member axis, the locking body carrier axis and the locking body member axis in the coupling position being oriented with respect to one another at a force transmission angle of greater than or equal to 150° and less than 180°, and
  wherein the locking body member is prestressed on the locking body carrier into a neutral position, out of which the locking body member can be pivoted in two opposed directions in relation to the neutral position.

15. A gear mechanism unit having a gear change coupling for coupling members, the gear change coupling comprising:
  a first member which has a coupling toothing system,
  a second member, on which at least one locking body arrangement is mounted pivotably, it being possible for the locking body arrangement to be pivoted into a coupling position, in the case of which a driving section of the locking body arrangement engages into the coupling toothing system, in order to couple the first member to the second member in a positively locking manner with respect to a relative movement in a first direction, and it being possible for the locking body arrangement to be pivoted into a release position, in the case of which the driving section of the locking body arrangement does not engage into the coupling toothing system,
  wherein the locking body arrangement has a locking body carrier which is mounted pivotably on the second member, and has a locking body member which is mounted pivotably on the locking body carrier and on which the driving section is configured,
  wherein, at a second end, the locking body carrier has a locking body carrier socket which is assigned a locking body member head of the locking body member, in order to form a second pivoting bearing between the locking body carrier and the locking body member, and
  wherein the locking body carrier has at least one holding lug which engages over the locking body member head, in order to hold the locking body member in the drive direction in relation to the locking body carrier.

16. A gear mechanism unit having a gear change coupling for coupling members, the gear change coupling comprising:
  a first member which has a coupling toothing system,
  a second member, on which at least one locking body arrangement is mounted pivotably, it being possible for the locking body arrangement to be pivoted into a coupling position, in the case of which a driving section of the locking body arrangement engages into the coupling toothing system, in order to couple the first member to the second member in a positively locking manner with respect to a relative movement in a first direction, and it being possible for the locking body arrangement to be pivoted into a release position, in the case of which the driving section of the locking body arrangement does not engage into the coupling toothing system,
  wherein the locking body arrangement has a locking body carrier which is mounted pivotably on the second member, and has a locking body member which is mounted pivotably on the locking body carrier and on which the driving section is configured,
  wherein the locking body carrier and the locking body member are connected to one another in series so that, in the coupling position, a force from the second member in a drive direction is transmitted firstly to the locking body carrier and from the locking body carrier to the locking body member which engages with its driving section into the coupling toothing system, so that the force is finally transmitted to the first member such that the first member and the second member rotate together.

* * * * *